US012743606B2

(12) United States Patent
Feng et al.

(10) Patent No.: US 12,743,606 B2
(45) Date of Patent: Sep. 22, 2026

(54) GENERATING SYNTHETIC DIGITAL IMAGES UTILIZING A TEXT-TO-IMAGE GENERATION NEURAL NETWORK WITH LOCALIZED CONSTRAINTS

(71) Applicant: Adobe Inc., San Jose, CA (US)

(72) Inventors: Weixi Feng, Goleta, CA (US); Yijun Li, Seattle, WA (US); Trung Bui, San Jose, CA (US); Tobias Hinz, Ulm (DE); Scott Cohen, Sunnyvale, CA (US); Quan Tran, San Jose, CA (US); Jianming Zhang, Campbell, CA (US); Handong Zhao, San Jose, CA (US); Franck Dernoncourt, Seattle, WA (US)

(73) Assignee: Adobe Inc., San Jose, CA (US)

( * ) Notice: Subject to any disclaimer, the term of this patent is extended or adjusted under 35 U.S.C. 154(b) by 274 days.

(21) Appl. No.: 18/619,587

(22) Filed: Mar. 28, 2024

(65) Prior Publication Data

US 2025/0307606 A1 Oct. 2, 2025

(51) Int. Cl.
*G06T 11/00* (2026.01)
*G06N 3/0455* (2023.01)

(52) U.S. Cl.
CPC ............ *G06N 3/0455* (2023.01); *G06T 11/00* (2013.01)

(58) Field of Classification Search
None
See application file for complete search history.

(56) References Cited

U.S. PATENT DOCUMENTS

2023/0377226 A1* 11/2023 Saharia .................... G06T 11/60
2024/0169662 A1* 5/2024 Sajjadi .................. G06T 15/205
(Continued)

FOREIGN PATENT DOCUMENTS

CN 110866958 A 3/2020
CN 114140666 A 3/2022
WO 2023/225344 A1 11/2023

OTHER PUBLICATIONS

Aditya Ramesh et al., "Hierarchical Text-Conditional Image Generation with CLIP Latents," arXiv:2204.06125v1, Apr. 13, 2022.
(Continued)

*Primary Examiner* — Idowu O Osifade
(74) *Attorney, Agent, or Firm* — Keller Preece PLLC

(57) ABSTRACT

Methods, systems, and non-transitory computer readable storage media are disclosed for generating digital images via a generative neural network with localized constraints. The disclosed system generates, utilizing one or more encoder neural networks, a sequence of embeddings comprising a prompt embedding representing a text prompt and an object text embedding representing a phrase indicating an object in the text prompt. The disclosed system generates, utilizing the one or more encoder neural networks, a visual embedding representing an object image corresponding to the object. The disclosed system determines a modified sequence of embeddings by replacing the object text embedding with the visual embedding in the sequence of embeddings. The disclosed system also generates, utilizing a generative neural network, a synthetic digital image from the modified sequence of embeddings comprising the visual embedding.

20 Claims, 14 Drawing Sheets

(56) References Cited

U.S. PATENT DOCUMENTS

| | | | | |
|---|---|---|---|---|
| 2024/0282131 | A1* | 8/2024 | Ren | G06V 10/7753 |
| 2024/0378256 | A1* | 11/2024 | Sadr | G06F 16/9538 |
| 2024/0394932 | A1* | 11/2024 | Chemerys | G06N 3/0455 |

OTHER PUBLICATIONS

Amir Hertz et al. "Prompt-to-prompt image editing with cross attention control."arXiv preprint arXiv:2208.01626v1, Aug. 2, 2022.
Hila Chefer et al., "Attend-and-Excite: Attention-Based Semantic Guidance for Text-to-Image Diffusion Models," arXiv:2301.13826v2, May 31, 2023.
Royi Rassin et al., "Linguistic Binding in Diffusion Models: Enhancing Attribute Correspondence through Attention Map Alignment," arXiv:2306.08877v2, Oct. 20, 2023.
Search Report as received in United Kingdom Application No. 2501054.7 dated Jul. 25, 2025.

* cited by examiner

GENERATING SYNTHETIC DIGITAL IMAGES UTILIZING A TEXT-TO-IMAGE GENERATION NEURAL NETWORK WITH LOCALIZED CONSTRAINTS

BACKGROUND

Improvements to machine-learning and neural network based image processing technologies have led to significant advancements in the ability of computing systems to generate synthetic digital image content. Specifically, many entities utilize generative neural networks to generate synthetic digital images for use in a number of different applications. For example, entities use generative neural networks for creating new images, replacing objects, inpainting images, or otherwise inserting synthetic digital content into digital images. Although the quality of generative neural networks (e.g., diffusion-based models) has steadily improved in generating realistic-looking content, ensuring that the generated content accurately reflects the constraints of input text prompts remains a challenging aspect of image generation tasks. Accordingly conventional systems that utilize text-to-image generative neural networks lack accuracy and flexibility in generating synthetic images from text prompts.

SUMMARY

One or more embodiments provide benefits and/or solve one or more of the foregoing or other problems in the art with systems, methods, and non-transitory computer readable storage media for generating digital images using a generative neural network localized constraints. The disclosed systems utilize a two-stage neural network including an encoder stage and a decoder stage. Specifically, the disclosed systems utilize the encoder stage to generate a sequence of embeddings including object text embeddings representing phrases in a text prompt indicating different objects with specific visual attributes. Additionally, the disclosed systems generate visual embeddings representing images of example objects corresponding to the objects (and respective visual attributes) indicated in the phrases and replaces the object text embeddings with the corresponding visual embeddings to determine a modified sequence of embeddings. The disclosed systems utilize the decoder stage to generate a synthetic digital image including the objects and respective visual attributes from the modified sequence of embeddings including the visual embeddings. The disclosed systems thus utilize a two-stage generative neural network that accurately generates synthetic image content with correct object attribute binding.

BRIEF DESCRIPTION OF THE DRAWINGS

Various embodiments will be described and explained with additional specificity and detail through the use of the accompanying drawings.

DETAILED DESCRIPTION

Figure 1:
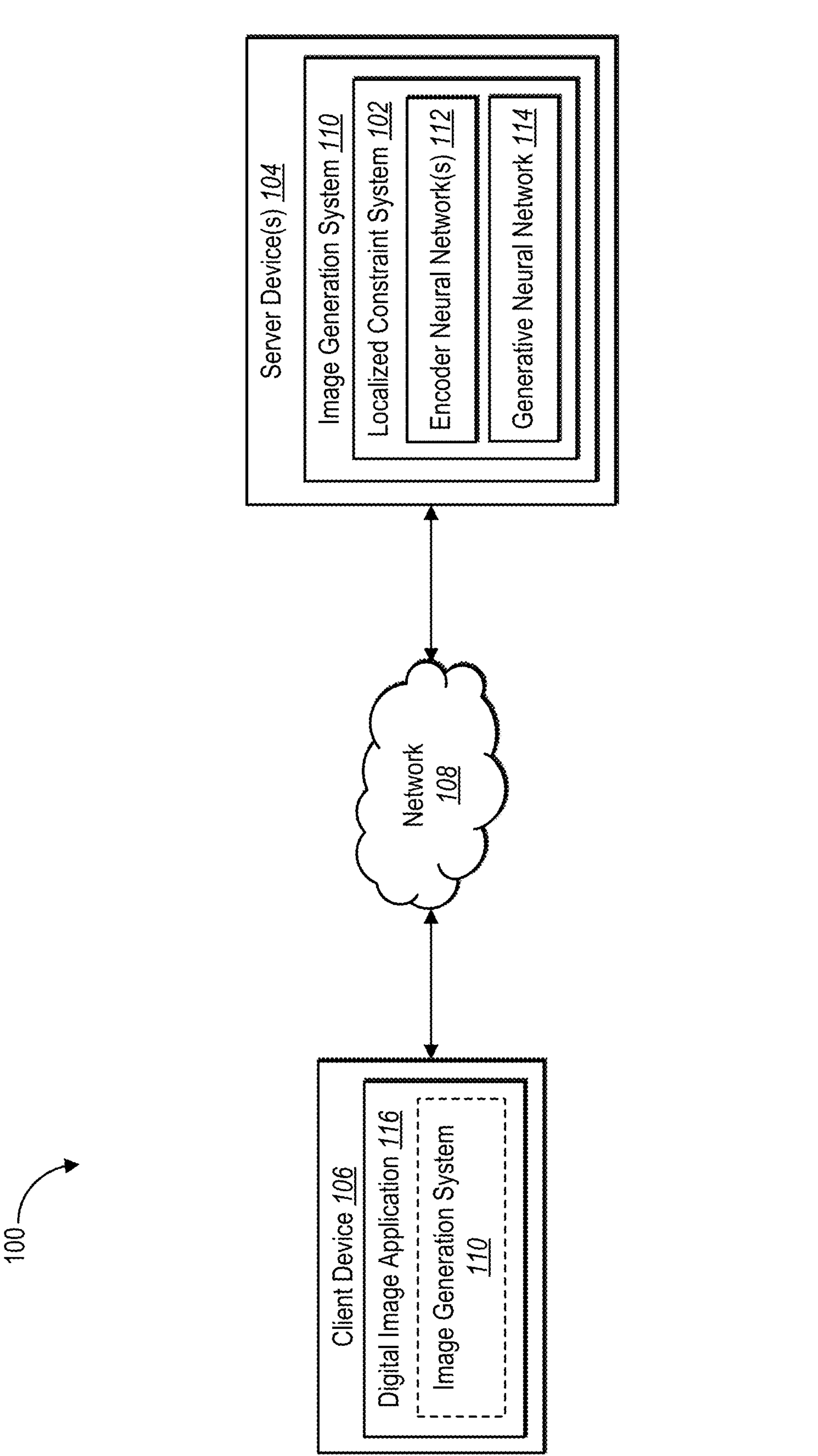
FIG. 1 illustrates an example system environment in which a localized constraint system operates in accordance with one or more implementations.

One or more embodiments of the present disclosure include a localized constraint system that generates synthetic digital images by encoding localized constraints into an embedding sequence of a text prompt. For example, the localized constraint system utilizes a two-stage neural network that includes an encoding neural network to generate a sequence of embeddings including a prompt embedding representing a text prompt and object text embeddings representing phrases corresponding to objects in the text prompt. Additionally, the localized constraint system modifies the sequence of embeddings by replacing the object text embeddings with visual embeddings representing object images for the objects in the text prompt. The localized constraint system utilizes a decoding neural network (e.g., a diffusion-based generative neural network) to generate a synthetic digital image from the modified sequence of embeddings that include the visual embeddings. Accordingly, the localized constraint system generates synthetic digital images with localized constraints during encoding in a text-to-image process to accurately generate objects with the correct visual attributes in accordance with a text prompt.

As mentioned, in one or more embodiments, the localized constraint system utilizes an encoding neural network to generate a sequence of embeddings from a text prompt in a text-to-image process. Specifically, the localized constraint system parses a text prompt to determine phrases indicating objects to generate in the text-to-image process. For example, a phrase indicating an object includes text describing the object and any attributes of the object. The localized constraint system generates a sequence of embeddings by encoding the phrases indicating the objects into object text embeddings in a feature space. In some embodiments, the localized constraint system also encodes the text prompt into a prompt embedding in the feature space.

According to one or more embodiments, the localized constraint system determines a modified sequence of embeddings by replacing the object text embeddings with visual embeddings of object images including example objects. In particular, the localized constraint system generates visual embeddings from object images including example objects in the same feature space as the object text embeddings. Additionally, the localized constraint system replaces object text embeddings with the corresponding visual embeddings in the sequence of embeddings, resulting in a modified sequence of embeddings. In some embodiments, the localized constraint system uses the modified sequence of embeddings to generate a synthetic digital image including objects and corresponding attributes indicated in the text prompt.

In some embodiments, the localized constraint system also trains a generative neural network based on ground-truth masks of objects in training images. Specifically, the localized constraint system determines a localization loss output of a loss function that compares the ground-truth masks to cross-attention maps generated by the generative neural network based on modified sequences of embeddings for the training images. Accordingly, the localized constraint system uses the localization loss with a diffusion loss to adjust parameters of the generative neural network to generate cross-attention maps that more closely correspond to the ground-truth masks.

Some conventional systems that provide synthetic image generation utilize generative neural networks to generate digital images based on text prompts via architectures that iteratively synthesize an image from a noise pattern. For example, some conventional systems utilize generative models to generate synthetic image content via "on-the-fly" optimization of cross-attention maps to reflect prior knowledge. Although such systems perform well in simple domains with simple prompts, these conventional systems lack accuracy when presented with complex prompts, especially prompts that include multiple objects with different visual attributes. In particular, these conventional systems force the cross-attention maps to reflect certain patterns, which leads to degraded image quality. Furthermore, such systems are not able to handle prompts that address relations beyond attribute binding.

Some conventional systems utilize diffusion-based models that iteratively synthesize images from noise patterns. For instance, the conventional systems utilize text encoders with cross-attention based conditioning to generate synthetic images. These conventional systems lack accuracy due to the text encoder failing to preserve image compositionality relative to the input text prompts. Additionally, because the output of such encoders is not aligned with the image space of the output of the generative neural network, these conventional systems lack accuracy in generating image content in certain domains (e.g., humans).

Furthermore, certain conventional systems that utilize diffusion-based models utilize image priors to generate synthetic digital image content. In particular, such conventional systems generate visual features (e.g., in a single text embedding) from a text input in a prior model and provide the text embedding to a diffusion decoder to generate synthetic image content. Because these conventional systems encode the semantic information of a text prompt into a single embedding, these conventional systems also often fail to reflect the compositionality of the text prompt. Accordingly, the conventional systems that use generative neural networks often fail to accurately reconstruct text inputs including multiple objects with different visual attributes in synthetic digital images.

The localized constraint system provides a number of advantages in computing systems that provide digital image generation via generative neural networks. For example, the localized constraint system improves accuracy by utilizing localized constraints via multimodal embeddings in a neural network that generates synthetic image content. In contrast to conventional systems that utilize a single embedding for a text prompt, the localized constraint system generates a sequence of embeddings including separate embeddings for phrases indicating objects in a text prompt. Specifically, by generating the sequence of embeddings with separate embeddings for phrases mentioning objects, the localized constraint system provides distinct embeddings to bind attributes to their corresponding objects.

Furthermore, the localized constraint system provides improved accuracy in synthetic digital images via neural network(s) with multimodal embeddings. In particular, the localized constraint system replaces object text embeddings representing object phrases with visual embeddings representing image objects including examples of the corresponding objects. Accordingly, the localized constraint system utilizes an embedding sequence of text embeddings and visual embeddings in the same feature space to generate synthetic digital images. Thus, in contrast to conventional systems that utilize only text encodings to generate digital images, the localized constraint system provides improved priors to accurately generate synthetic image content across various domains while also providing correct object composition relative to the text prompts.

In additional embodiments, the localized constraint system utilizes a loss function to determine a combined diffusion loss and localization loss to improve the accuracy of generated synthetic image content. For instance, the localized constraint system utilizes a set of training images to reduce the output of the loss function based on a comparison of cross-attention maps generated by the generative neural network to ground-truth masks of the training images. Accordingly, in contrast to existing systems that use "on-the-fly" optimization of cross-attention maps according to specific patterns, the localized constraint system uses the localization loss to force the individual cross-attention maps of a plurality of different objects in a single image to align with the object masks. Thus, the localized constraint system provides an improved generative neural network that more accurately generates synthetic image content with correct object composition by combining diffusion loss and localization loss.

Turning now to the figures, FIG. 1 includes an embodiment of a system environment 100 in which a localized constraint system 102 is implemented. In particular, the system environment 100 includes server device(s) 104 and a client device 106 in communication via a network 108. Moreover, as shown, the server device(s) 104 include a digital image system 110, which includes the localized constraint system 102. Additionally, the localized constraint system 102 includes, or accesses, encoder neural network(s) 112 and a generative neural network 114. Although FIG. 1 illustrates that the server device(s) 104 host the encoder neural network(s) 112 and/or generative neural network 114, in alternative embodiments, the encoder neural network(s) 112 and/or generative neural network 114 are hosted by another device or system (e.g., a third-party computing system). Furthermore, the client device 106 includes a digital image application 116, which optionally includes the digital image system 110 (and the localized constraint system 102).

As shown in FIG. 1, the client device 106 or the server device(s) 104 include or host the digital image system 110. The digital image system 110 includes, or is part of, one or more systems that implement digital image generation or editing operations. For example, the digital image system 110 provides tools for generating or editing digital images (e.g., in synthetic image content tasks). To illustrate, the digital image system 110 communicates with the client device 106 via the network 108 to provide the tools for display and interaction via the digital image application 116 at the client device 106. Additionally, in some embodiments, the digital image system 110 receives requests to access digital image data stored (e.g., at the server device(s) 104 or at another device such as a database) and/or requests to store digital image data. In some embodiments, the digital image system 110 receives interaction data for viewing or performing various image processing operations and provides the results of the interaction data (e.g., generated digital image data) for display via the digital image application 116 or to a third-party system.

According to one or more embodiments, the digital image system 110 utilizes the localized constraint system 102 to generate synthetic images via the encoder neural network(s) 112 and the generative neural network 114 with localized constraints. In particular, the localized constraint system 102 generates sequences of embeddings representing phrases indicating different objects and corresponding attributes based on a text prompt. Additionally, the localized constraint system 102 modifies the embeddings by replacing object text embeddings with visual embeddings representing example objects corresponding to the objects in the text prompt. The localized constraint system 102 utilizes the generative neural network 114 to generate synthetic digital image content from a modified sequence of embeddings including the visual embeddings. Accordingly, the localized constraint system 102 provides accurate synthetic image content generation that ties attributes to the correct objects according to a text prompt via a generative neural network pipeline (e.g., utilizing a diffusion-based model).

As illustrated in FIG. 1, the localized constraint system 102 is implemented on the client device 106 or on the server device(s) 104. In particular, in some implementations, the localized constraint system 102 on the server device(s) 104 supports the localized constraint system 102 on the client device 106. For instance, the server device(s) 104 generates or obtains the localized constraint system 102 (e.g., the encoder neural network(s) 112 and the generative neural network 114) for the client device 106 (e.g., as part of a software application or suite). The server device(s) 104 provides the localized constraint system 102 to the client device 106 for performing digital image generation/editing processes at the client device 106. In other words, the client device 106 obtains (e.g., downloads) the localized constraint system 102 from the server device(s) 104. At this point, the client device 106 is able to utilize the localized constraint system 102 to generate/edit digital images independently from the server device(s) 104.

In additional embodiments, although FIG. 1 illustrates the server device(s) 104 and the client device 106 communicating via the network 108, the various components of the system environment 100 communicate and/or interact via other methods (e.g., the server device(s) 104 and the client device 106 communicate directly). Furthermore, although FIG. 1 illustrates the localized constraint system 102 being implemented by a particular component and/or device within the system environment 100, the localized constraint system 102 is implemented, in whole or in part, by other computing devices and/or components in the system environment 100. For example, in some embodiments, the server device(s) 104 include or host the digital image system 110 and/or the localized constraint system 102.

To illustrate, the localized constraint system 102 includes a web hosting application that allows the client device 106 to interact with content and services hosted on the server device(s) 104 (e.g., in a software as a service implementation). To illustrate, in one or more implementations, the client device 106 accesses a web page supported by the server device(s) 104. The client device 106 provides input to the server device(s) 104 to perform digital image generation and, in response, the localized constraint system 102 or the digital image system 110 on the server device(s) 104 performs operations to generate a digital image via the encoder neural network(s) 112 and the generative neural network 114. The server device(s) 104 provide the output or results of the operations to the client device 106.

In one or more embodiments, the server device(s) 104 include a variety of computing devices, including those described below with reference to FIG. 13. For example, the server device(s) 104 includes one or more servers for storing and processing data associated with image generation and editing. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 13). Furthermore, although not shown in FIG. 1, the client device 106 is operable by a user (e.g., a user included in, or associated with, the system environment 100) to perform a variety of functions. In particular, the client device 106 performs functions such as, but not limited to, accessing, viewing, generating, and editing digital images. In some embodiments, the client device 106 also performs functions for generating, capturing, or accessing data to provide to the digital image system 110 and the localized constraint system 102 in connection with editing digital images. For example, the client device 106 communicates with the server device (s) 104 via the network 108 to provide information (e.g., user interactions) associated with digital images. Although FIG. 1 illustrates the system environment 100 with a single client device, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 optionally include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 13.

Figure 2:
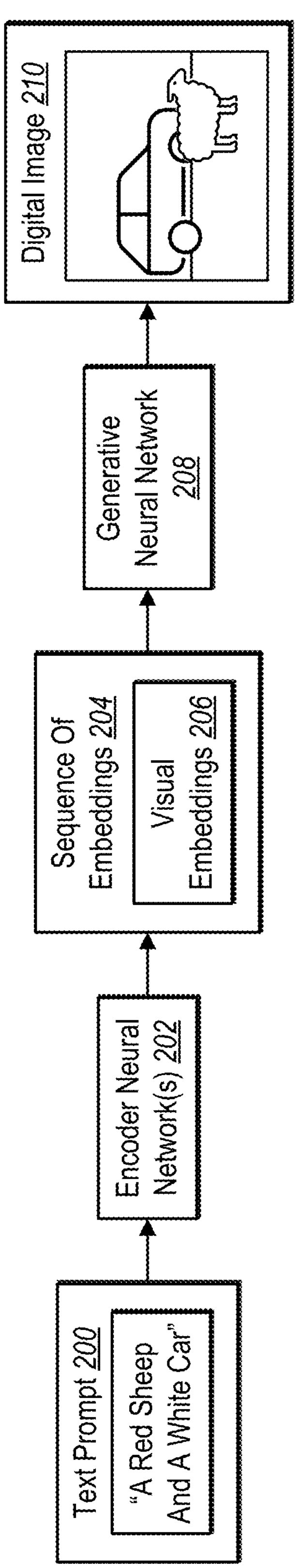
FIG. 2 illustrates a diagram of an overview of the localized constraint system utilizing a two-stage neural network to generate a sequence of embeddings with visual embeddings for generating a synthetic digital image in accordance with one or more implementations.

As mentioned, the localized constraint system 102 utilizes one or more neural networks with localized constraints to generate synthetic image content with correct object compositionality. FIG. 2 illustrates the localized constraint system 102 utilizing a plurality of neural networks to generate a digital image from a text prompt. Specifically, FIG. 2 illustrates that the localized constraint system 102 generates the digital image based on a sequence of embeddings representing elements of the text prompt.

As illustrated in FIG. 2, the localized constraint system 102 determines a text prompt 200 for generating synthetic digital image content in connection with a request to perform text-to-image operations. For example, the text prompt 200 includes a sentence, a phrase, or a combination of phrases in text format to generate or edit a digital image. To illustrate, the text prompt 200 includes "A red sheep and a white car," indicating a request to generate one or more objects in a scene.

In one or more embodiments, the text prompt 200 includes a plurality of separate phrases indicating a plurality of objects to include in the generated image content. Additionally, in at least some embodiments, a phrase includes a description of an object with one or more visual attributes (e.g., color, size, shape, position, or other appearance characteristic) of the object. Accordingly, in various embodiments, the text prompt 200 includes one or more words describing a compositionality of a plurality of objects in a scene for generating synthetic image content. For example, a first phrase indicates "A red sheep" and a second phrase indicates "a white car," each with indicating a separate object and a corresponding attribute (or set of attributes).

Figure 3:
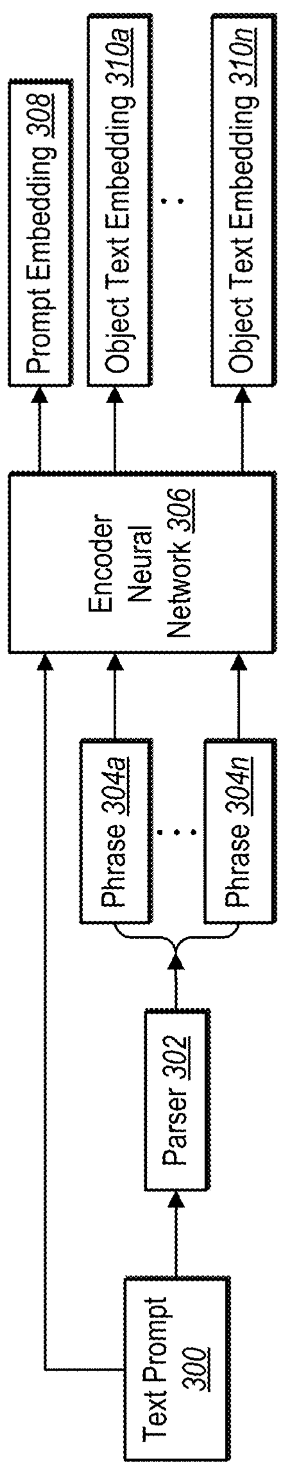
FIG. 3 illustrates a diagram of the localized constraint system generating a prompt embedding and a plurality of object text embeddings from a text prompt in accordance with one or more implementations.
Figure 4:
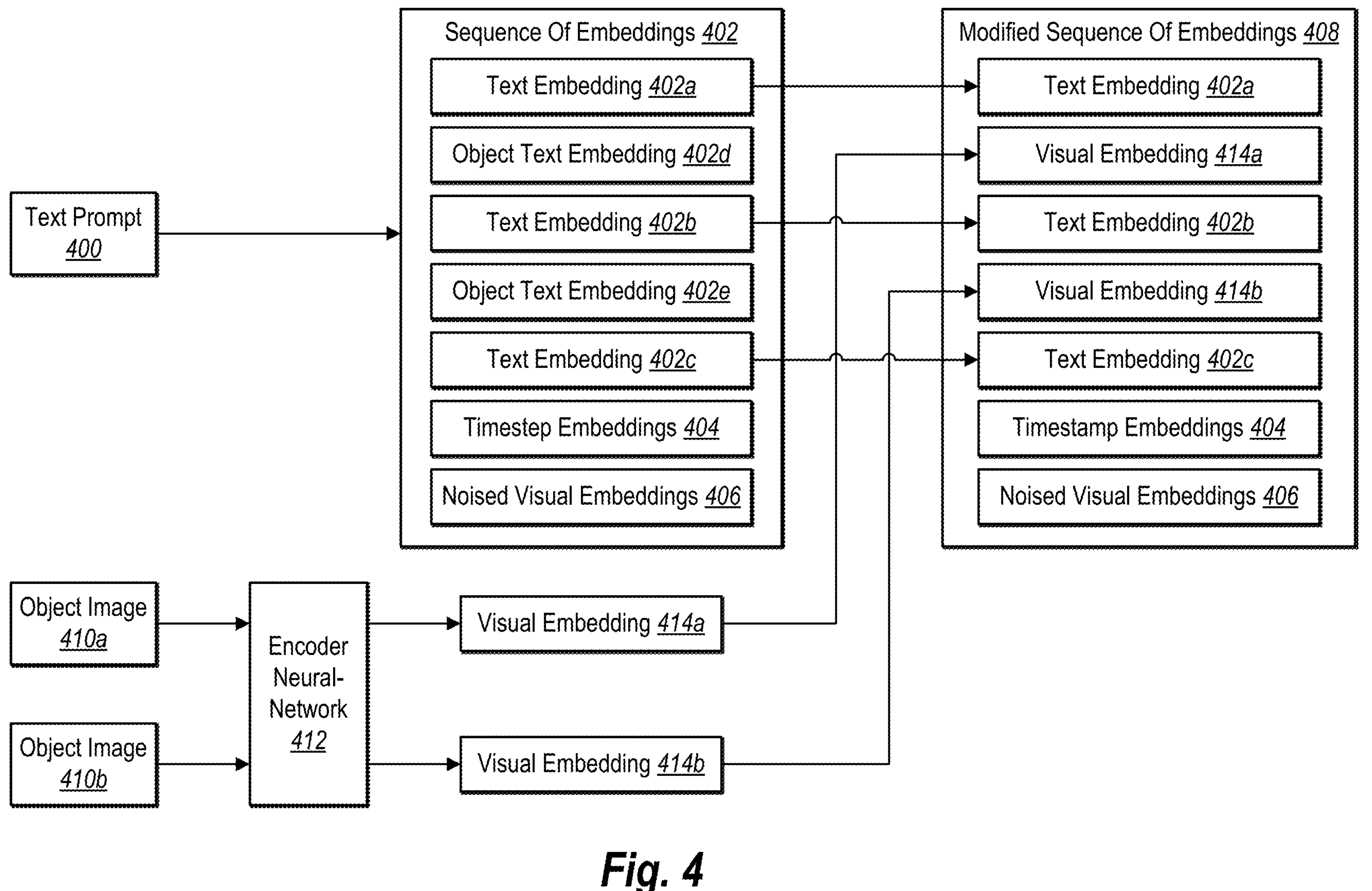
FIG. 4 illustrates a diagram of the localized constraint system replacing object text embeddings with corresponding visual embeddings in a sequence of embeddings in accordance with one or more implementations.
Figure 5:
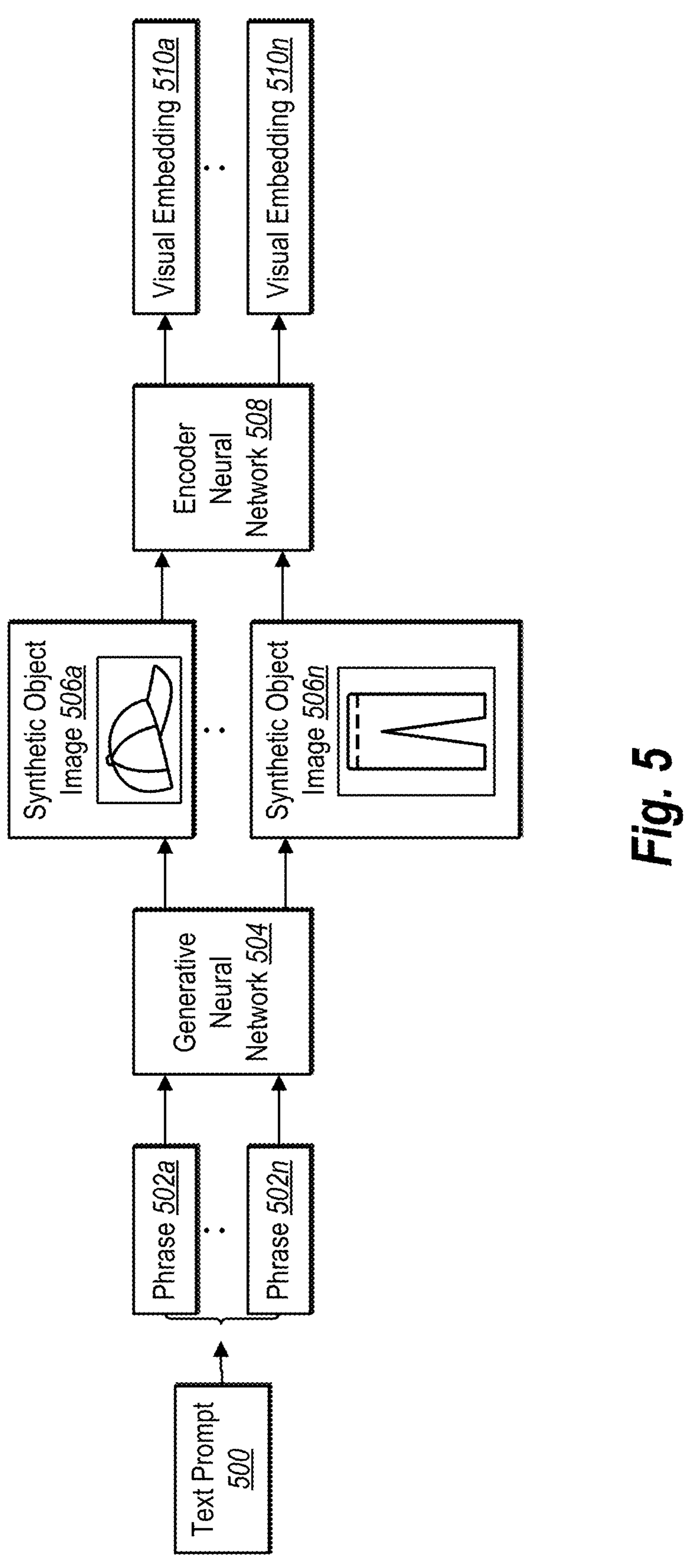
FIG. 5 illustrates a diagram of the localized constraint system generating visual embeddings representing synthetic object images in accordance with one or more implementations.

Additionally, in one or more embodiments, the localized constraint system 102 utilizes one or more encoder neural network(s) 202 to encode the text prompt 200 into a feature space. For instance, the localized constraint system 102 utilizes the encoder neural network(s) 112 to generate a sequence of embeddings 204 including text embeddings representing the text prompt 200 and one or more phrases in the text prompt 200. Furthermore, the localized constraint system 102 generates visual embeddings representing the objects indicated by the text prompt 200, such as by utilizing the encoder neural network(s) 202 to encode example objects in object images generated (or otherwise corresponding to) the phrases of the text prompt 200. The localized constraint system 102 thus generates the sequence of embeddings 204 to include the visual embeddings 206 in the feature space of the text embeddings. FIGS. 3-5 and the corresponding description provide additional detail with respect to generating embeddings from a text prompt.

Figure 6:
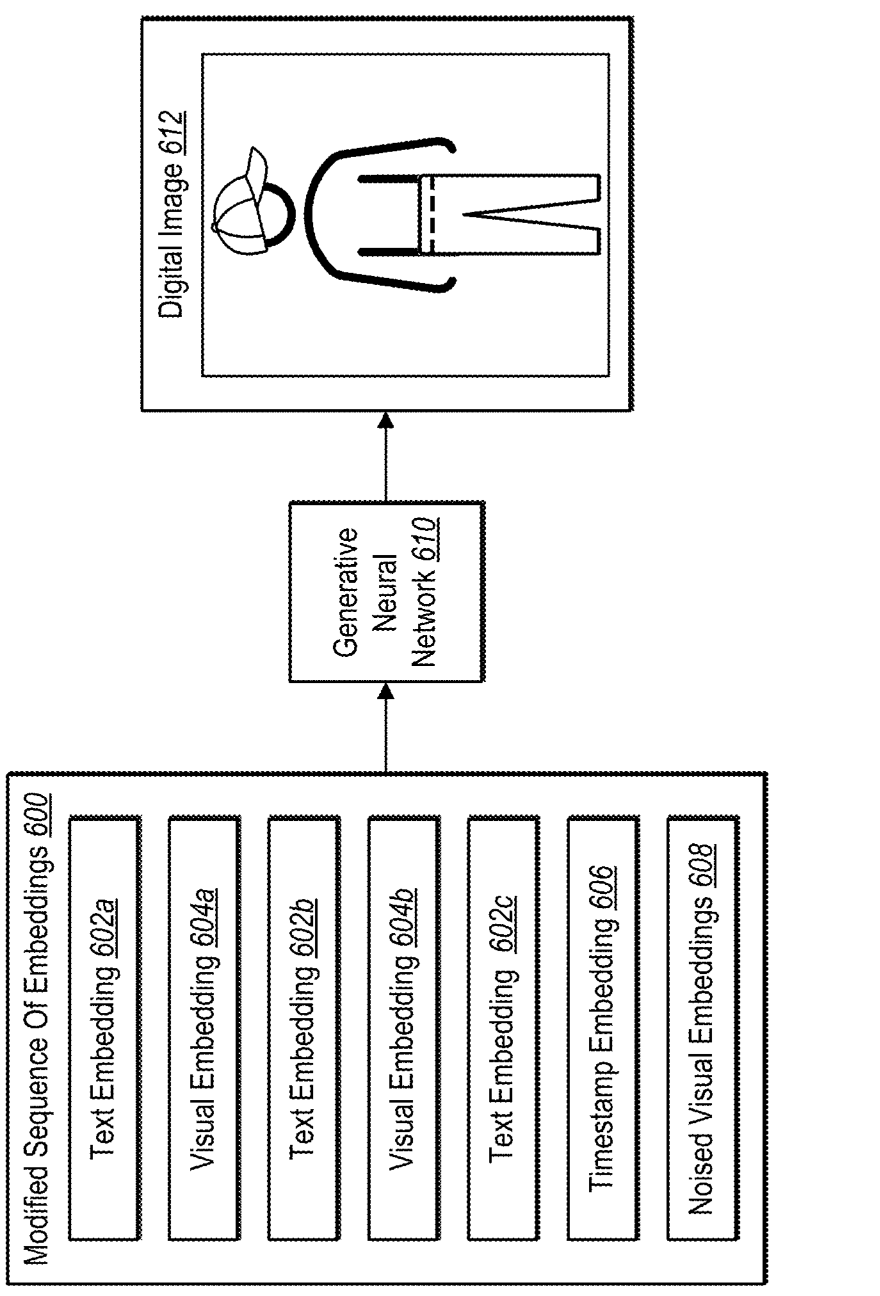
FIG. 6 illustrates a diagram of the localized constraint system generating a digital image from a modified sequence of embeddings in accordance with one or more implementations.

The localized constraint system 102 also utilizes a generative neural network 208 to generate a digital image 210 based on the sequence of embeddings 204. Specifically, as illustrated in FIG. 2, the localized constraint system 102 utilizes the generative neural network 208 to generate synthetic image content in the digital image 210 based on the text prompt 200. More specifically, the localized constraint system 102 generates the digital image 210 to include the one or more objects indicated in the text prompt 200 with the correct compositionality (e.g., the correct assignment of attributes to the corresponding objects indicated in the text prompt 200). FIG. 6 and the corresponding description provide additional detail with respect to generating a digital image from a sequence of embeddings including text embeddings and visual embeddings.

In one or more embodiments, the localized constraint system 102 generates embeddings in a feature space from a text prompt by utilizing one or more encoder neural networks. FIG. 3 illustrates an example of the localized constraint system 102 generating embeddings representing a text prompt to generate a digital image. In particular, FIG. 3 illustrates that the localized constraint system 102 generates embeddings representing text, and portions of the text, in a text prompt for generating synthetic image content.

As illustrated in FIG. 3, the localized constraint system 102 determines a text prompt 300 to generate a digital image including synthetic image content. For instance, as mentioned, the text prompt 300 includes phrases indicating one or more objects to include in the synthetic image content. In some embodiments, the text prompt 300 includes one or more natural language phrases including one or more subphrases that indicate the object(s) to include in the synthetic image content. Additionally, the text prompt 300 includes a compositionality indicating a layout of the object(s) in a scene, visual attributes of the object(s), and/or relationships between a plurality of objects.

In one or more embodiments, the localized constraint system 102 utilizes a parser 302 to segment the text prompt 300 into phrases 304*a*-304*n*. For example, the parser 302 includes a natural language parser that identifies parts of speech and relationships between the parts of speech to separate the text prompt 300 into separate groups of text. To illustrate, the localized constraint system 102 utilizes the parser 302 to separate the text prompt 300 into the plurality of phrases by grouping words indicating an object and its corresponding attributes into a single phrase (e.g., "a red sheep"). Thus, the plurality of phrases correspond to different groups of words corresponding to the separate objects and their visual attributes.

In at least some embodiments, localized constraint system 102 utilizes an encoder neural network 306 to generate embeddings from the text prompt 300 and the phrases 304*a*-304*n*. Specifically, the encoder neural network 306 includes a text encoder neural network that converts words and/or phrases into a feature space based on features extracted from the words/phrases. Accordingly the localized constraint system 102 utilizes a pretrained text encoder neural network that encodes the phrases 304*a*-04*n* into a feature space learned according to relationships between image content and corresponding text content describing the image content. Thus, the feature space includes an abstract embedding space that represents features of text and/or image content.

In one or more embodiments, the localized constraint system 102 utilizes the encoder neural network 306 to generate a prompt embedding 308 representing the text prompt 300 as a whole. In particular, the prompt embedding 308 includes an encoding representing the text prompt 300 as a whole in the feature space. For instance, the localized constraint system 102 utilizes the encoder neural network 306 to embed features of all elements of the text prompt 300 into a single embedding (e.g., a single feature vector) in the feature space. In some embodiments, the localized constraint system 102 does not generate the prompt embedding 308 and only generates embeddings for individual portions of the text prompt 300. In additional embodiments, the localized constraint system 102 generates the prompt embedding 308 and identifies the specific portions of the prompt embedding 308 corresponding to objects.

Additionally, as illustrated in FIG. 3, the localized constraint system 102 utilizes the encoder to generate object text embeddings 310*a*-310*n* representing phrases that indicate objects in the text prompt 300. Specifically, the localized constraint system 102 utilizes the encoder neural network 306 to generate the object text embeddings 310*a*-310*n* from the phrases 304*a*-304*n* extracted from the text prompt 300. As an example, the localized constraint system 102 generates a first object text embedding 310*a* representing a first phrase 304*a* indicating an object and its attributes (e.g., "a red sheep"). In an additional example, the localized constraint system 102 generates a second object text embedding 310*n* representing a second phrase 304*n* indicating another object and its attributes (e.g., "a white car"). Thus, in one or more embodiments, the localized constraint system 102 generates a prompt embedding 308 representing the text prompt 300 as a whole and one or more object text embeddings representing individual objects (and their attributes) indicated in the text prompt 300.

In one or more embodiments, in response to generating embeddings from a text prompt, the localized constraint system 102 determines a sequence of embeddings to provide to use in generating synthetic image content. FIG. 4 illustrates an embodiment in which the localized constraint system 102 determines an initial sequence of embeddings including text embeddings based on a text prompt. Additionally, FIG. 4 illustrates that the localized constraint system 102 determines a modified sequence of embeddings by replacing one or more text embeddings with visual embeddings corresponding to object images representing objects mentioned in the text prompt.

According to one or more embodiments, as mentioned, the localized constraint system 102 utilizes an encoder neural network to generate embeddings for portions of a text prompt 400. In one or more embodiments, the localized constraint system 102 determines a sequence of embeddings 402 by generating a plurality of text embeddings representing different words and/or phrases in the text prompt 400. For instance, the localized constraint system 102 generates a plurality of text embeddings (e.g., a first text embedding 402*a*, a second text embedding 402*b*, and a third text embedding 402*c*) representing words (or groups of words representing individual concepts) in the text prompt 400. Additionally, the localized constraint system 102 generates a plurality of object text embeddings (e.g., a first object text embedding 402*d* and a second object text embedding 402*e*) representing words or phrases indicating objects and corresponding attributes (e.g., adjectives describing the objects) in the text prompt 400.

In some embodiments, the localized constraint system 102 determines the text embeddings and object text embeddings in an order according to the order in which the words/phrases occur in the text prompt 400. In additional embodiments, the localized constraint system 102 determines the sequence of embeddings 402 to include a prompt embedding representing the text prompt 400 as a whole, one or more text embeddings representing the non-object words/phrases and one or more object text embeddings representing phrases indicating objects. In further embodiments, the localized constraint system 102 determines the sequence of embeddings 402 to include a prompt embedding and one or more object text embeddings while excluding text embeddings representing non-objects.

As illustrated in FIG. 4, the localized constraint system 102 also determines the sequence of embeddings 402 to include a timestep encoding 404 corresponding to a timestep parameter for use in a diffusion-based generative neural network by utilizing an encoder neural network to generate the timestep encoding 404. Additionally, as illustrated, the sequence of embeddings 402 also includes noised visual embeddings 406 corresponding to a noise input for the diffusion-based generative neural network. To illustrate, the localized constraint system 102 determines one or more portions of a noised image input (e.g., one or more noise patches) by utilizing an encoder neural network to generate the noised visual embeddings 406 to represent the one or more portions of the noised image input.

In one or more embodiments, the localized constraint system 102 determines a modified sequence of embeddings 408 by replacing one or more embeddings in the sequence of embeddings 402 with embeddings representing visual image content. In particular, as illustrated, the localized constraint system 102 determines one or more object images (e.g., a first object image 410*a* and a second object image 410*b*) including example objects corresponding to objects mentioned in the text prompt 400. For example, the localized constraint system 102 determines the object images in response to a selection of the object images by a user (e.g., via a graphical user interface). To illustrate, the localized constraint system 102 provides a plurality of object images including different examples of an object in a phrase of the text prompt 400 (e.g., different versions of the object as generated by a generative neural network or from a selection of images in a database). In additional embodiments, the localized constraint system 102 generates the object images utilizing a generative neural network based on the phrases extracted from the text prompt 400, and as described in more detail below with respect to FIG. 5.

According to one or more embodiments, the localized constraint system 102 generates visual embeddings for the object images. Specifically, the localized constraint system 102 utilizes an encoder neural network 412 (e.g., an image encoder neural network) to generate the visual embeddings from the object images. For example, the localized constraint system 102 utilizes the encoder neural network 412 to generate a first visual embedding 414*a* representing the first object image 410*a* and a second visual embedding 414*b* representing the second object image 410*b*. In one or more embodiments, the visual embeddings are in the same feature space as the text embeddings. In other words, the text encoder neural network and the image encoder neural network generate embeddings in the same feature space such that images and text are represented in the same feature space.

In response to generating the visual embeddings, the localized constraint system 102 determines the modified sequence of embeddings 408 using the visual embeddings. In particular, as illustrated, the localized constraint system

102 replaces the object text embeddings with the corresponding visual embeddings. For example, the localized constraint system 102 determines a location/position of the first object text embedding 402*d* in the sequence of embeddings 402 and removes the first object text embedding 402*d*.

Additionally, the localized constraint system 102 inserts the first visual embedding 414*a* corresponding to the object of the first object text embedding 402*d* at the location of the first object text embedding 402*d* (i.e., the location prior to its removal). Similarly, the localized constraint system 102 inserts the second visual embedding 414*b* at a location of the second object text embedding 402*e* after removing the second object text embedding 402*e*. Accordingly, the localized constraint system 102 determines the modified sequence of embeddings 408 by replacing the object text embeddings with the visual embeddings at the corresponding locations.

In one or more embodiments, as mentioned, the localized constraint system 102 generates object images utilizing a generative neural network. FIG. 5 illustrates an embodiment in which the localized constraint system 102 generates synthetic object images including examples of objects indicated in a text prompt. Specifically, the localized constraint system 102 utilizes the text prompt to generate the synthetic object images for use in generating visual embeddings to replace object text embeddings.

As illustrated in FIG. 5, the localized constraint system 102 parses a text prompt 500 to determine phrases 502*a*-502*n* corresponding to objects indicated the text prompt 500. For example, the localized constraint system 102 determines, from the text prompt 500, a first phrase 502*a* corresponding to a first object and a second phrase 502*n* corresponding to a second object. To illustrate, the first phrase 502*a* indicates a first object in one or more words such as "a white hat." Additionally, the second phrase 502*n* indicates a second object in one or more words such as "a pair of blue jeans."

Furthermore, the localized constraint system 102 provides the phrases to a generative neural network 504 as separate prompts (or in connection with generating prompts). Accordingly, the localized constraint system 102 utilizes the generative neural network 504 to generate a first synthetic object image 506*a* and a second synthetic object image 506*n*. In line with the example above, the localized constraint system 102 utilizes the generative neural network 504 to generate the first synthetic object image 506*a* including an example of a white hat by feeding the generative neural network the first phrase 502*a*. The localized constraint system 102 utilizes the generative neural network 504 to generate the second synthetic object image 506*n* including an example of blue jeans by feeding the generative neural network the second phrase 502*n*.

In one or more embodiments, the localized constraint system 102 utilizes an encoder neural network 508 to generate visual embeddings from the synthetic object images. For instance, the localized constraint system 102 utilizes an image encoder neural network to generate a first visual embedding 510*a* representing the first synthetic object image 506*a*. Additionally, the localized constraint system 102 utilizes the image encoder neural network to generate a second visual embedding 510*n* representing the second synthetic object image 506*n*. As mentioned, the encoder neural network 508 generates the visual embeddings within the same feature space as object text embeddings representing the corresponding phrases of the text prompt.

In at least some embodiments, in response to generating the visual embeddings, the localized constraint system 102 determines a modified sequence of embeddings for use in generating a synthetic digital image. FIG. 6 illustrates an embodiment in which the localized constraint system 102 utilizes a generative neural network to generate a digital image from a modified sequence of embeddings.

As illustrated in FIG. 6, the localized constraint system 102 determines a modified sequence of embeddings 600 including one or more non-object text embeddings (e.g., text embeddings 602*a*-602*c*), one or more visual embeddings (e.g., visual embeddings 604*a*-604*b*), a timestep embedding 606, and noised visual embeddings 608. In one or more embodiments, the localized constraint system 102 provides the modified sequence of embeddings 600 to a generative neural network 610 to generate a digital image 612 including synthetic image content based on the text prompt. For example, the localized constraint system 102 utilizes a diffusion-based neural network to generate the digital image 612.

Accordingly, in one or more embodiments, the localized constraint system 102 provides the modified sequence of embeddings 600 to one or more diffusion decoders of the generative neural network 610 to iteratively generate the digital image 612. More specifically, the localized constraint system 102 utilizes a plurality of diffusion decoders to generate the digital image 612 from the text embeddings 602*a*-602*c*, visual embeddings 604*a*-604*b*, and noised visual embeddings 608 at a plurality of different diffusion steps according to the timestep embedding 606. Thus, the localized constraint system 102 generates the digital image 612 to include one or more objects mentioned in the text prompt with the correct composition (e.g., visual attributes) relative to the text prompt.

According to one or more embodiments, the localized constraint system 102 determines a sequence of embeddings including visual tokens $v_i$ that each represents or corresponds to a phrase $p_i$ indicating a visual object in a digital image. In particular, the localized constraint system 102 determines the sequence as encoded text (or prompt embedding) y of a text prompt, text embeddings of separate phrases $p_1, p_2, \ldots, p_n$ in the text prompt, a timestep t, noised visual embeddings z $$z_i^{(t)},$$

and a sequence of learnable queries. Specifically, the learnable queries represent visual tokens $v_i$ for individual phrases in the text prompt. Thus, in one or more embodiments, the localized constraint system 102 determines a prior for the localized constraint system represented as $$L_{prior} = \mathbb{E}_{t\sim[1,T],z_i^{(t)}\sim q_t}\left[\left\|\left(z_i^{(t)}, t, p_1, p_2, \ldots, p_n, y\right) - z_i\right\|^2\right].$$

Figure 7:
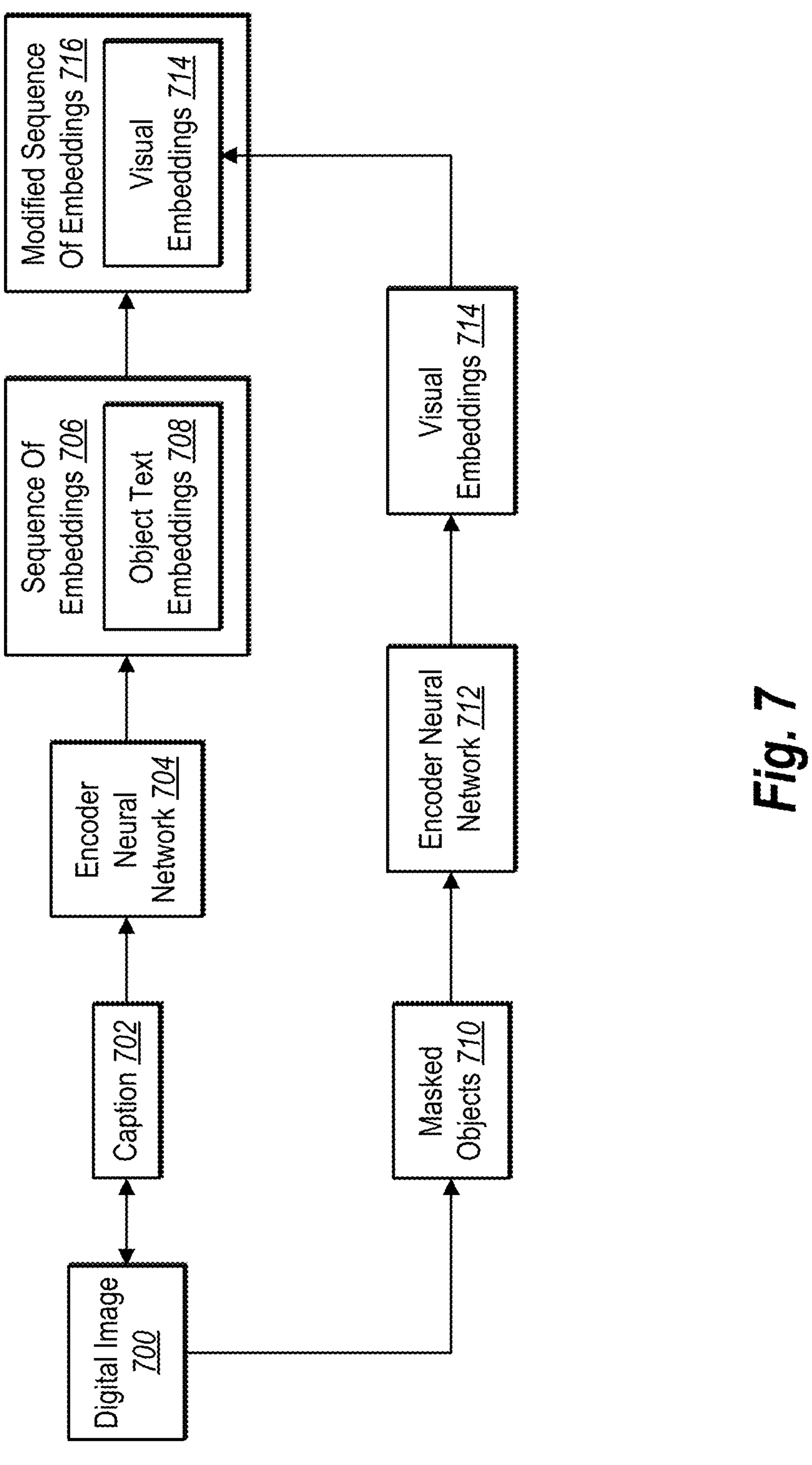
FIG. 7 illustrates a diagram of the localized constraint system generating a modified sequence of embeddings for adjusting parameters of a generative neural network in accordance with one or more implementations.
Figure 8:
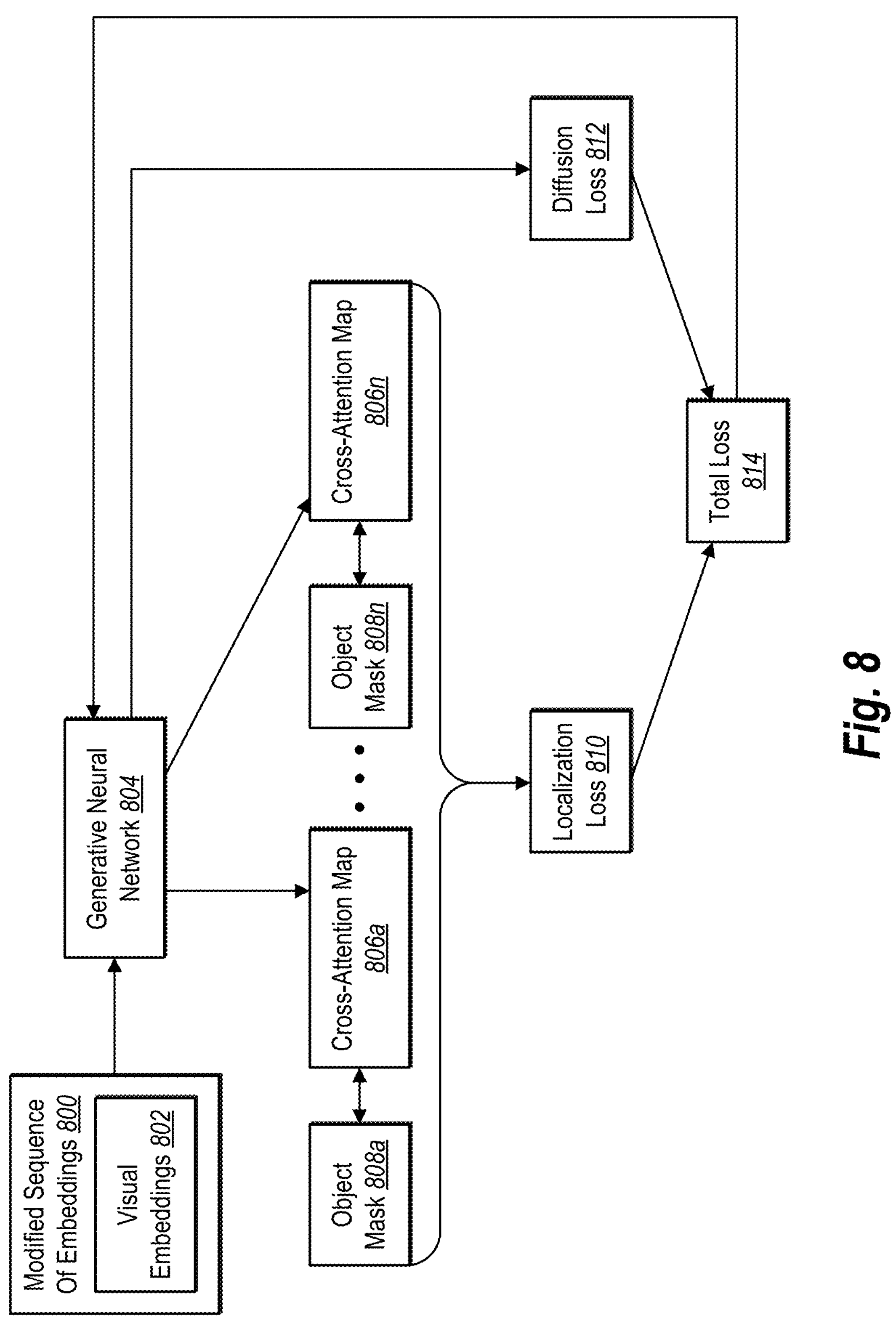
FIG. 8 illustrates a diagram of the localized constraint system determining a localization loss based on ground-truth object masks and cross-attention maps for adjusting parameters of a generative neural network in accordance with one or more implementations.

FIGS. 7-8 illustrate diagrams of the localized constraint system 102 utilizing ground-truth image data to train a generative neural network involved with generating synthetic image content in a text-to-image process. Specifically, FIG. 7 illustrates that the localized constraint system 102 determines an embedding sequence including text embeddings and visual embeddings based on image-caption pairs. FIG. 8 illustrates that the localized constraint system 102 uses the embedding sequence of FIG. 7 to train a generative neural network via a localization loss and a diffusion loss.

As mentioned, FIG. 7 illustrates that the localized constraint system 102 determines an image-caption pair for determining an embedding sequence. In particular, as illustrated, the localized constraint system 102 determines a digital image 700 including one or more objects in a scene. Additionally, the localized constraint system 102 determines a caption 702 for the digital image 700. For example, the caption 702 includes text describing the digital image 700. To illustrate, the caption 702 includes one or more phrases describing the one or more objects in the scene, as well as describing various attributes of the one or more objects. In some embodiments, the caption 702 also includes relative positioning information for the object(s) in the digital image 700.

In at least some embodiments, the localized constraint system 102 utilizes an encoder neural network 704 to generate a sequence of embeddings based on the caption 702. Specifically, as previously mentioned, the localized constraint system 102 utilizes a text encoder neural network to generate text embeddings from the caption 702 in a feature space. For example, the localized constraint system 102 generates object text embeddings 708 representing objects indicated in separate phrases of the caption 702.

Additionally, in some embodiments, the localized constraint system 102 determines masked objects 710 corresponding to the digital image 700. In particular, the localized constraint system 102 determines ground-truth segmentation masks for a plurality of objects in the digital image 700. In some embodiments, the ground-truth segmentation masks include binary masks to mask the objects from the digital image 700 (e.g., foreground masks that isolate the individual objects from a background of the digital image 700). Accordingly, the localized constraint system 102 determines the masked objects 710 including the pixel values representing foreground objects without background information to use as ground-truth object images.

As illustrated in FIG. 7, the localized constraint system 102 utilizes an encoder neural network 712 to generate visual embeddings 714 representing the masked objects 710. In one or more embodiments, the encoder neural network 712 is an image encoder neural network that encodes the masked objects 710 as the visual embeddings 714 in the same feature space as the object text embeddings 708. Thus, the localized constraint system 102 utilizes the encoder neural network 712 to encode the visual information of the masked objects 710 into the same feature space as the text of the caption 702 that describes the masked objects 710.

In one or more embodiments, the localized constraint system 102 determines a modified sequence of embeddings 716 based on the sequence of embeddings 706 and the visual embeddings 714. Specifically, the localized constraint system 102 replaces the object text embeddings 708 in the sequence of embeddings 706 with the visual embeddings 714 to create the modified sequence of embeddings 716. Thus, the localized constraint system 102 replaces encodings of text representing the objects in the caption 702 with embeddings of images representing the masked objects 710 from the digital image 700.

As illustrated in FIG. 8, the localized constraint system 102 utilizes a modified sequence of embeddings 800 including visual embeddings 802 to train a generative neural network 804. In particular, the localized constraint system 102 determines the modified sequence of embeddings 800, as described in FIG. 7. Additionally, the localized constraint system 102 utilizes the generative neural network 804 to generate digital image content via one or more image generation steps. For example, the generative neural network 804 includes a diffusion-based model that iteratively generates digital image content via a plurality of diffusion steps that create cross-attention maps corresponding to portions of digital image content being generated.

In one or more embodiments, the localized constraint system 102 utilizes the generative neural network 804 to generate a plurality of cross-attention maps 806*a*-806*n* based on the visual embeddings 802. For example, the localized constraint system 102 uses cross-attention in connection with denoising a noise input (e.g., noised visual tokens) based on the corresponding visual embeddings 802 and/or text embeddings. In some examples, the generative neural network 804 generates the cross-attention maps 806*a*-806*n* at each diffusion step for iteratively generating a digital image output.

According to some embodiments, the localized constraint system 102 enforces alignment of the cross-attention maps 806*a*-806*n* of the visual embeddings 802 with corresponding object masks. In particular, the localized constraint system 102 utilizes object masks 808*a*-808*n* corresponding to the masked objects represented by the visual embeddings 802 as ground-truth masks for comparing to the cross-attention maps. For instance, the localized constraint system 102 determines the binary masks (or alpha mattes) used to generate the masked objects as the object masks 808*a*-808*n*. To illustrate, a first object mask 808*a* corresponds to a mask for a first object (e.g., a mask for pants) and a second object mask 808*n* corresponds to a mask for a second object (e.g., a mask for a hat).

Furthermore, the localized constraint system 102 compares the cross-attention maps 806*a*-806*n* to the object masks 808*a*-808*n* to determine a localization loss 810. For example, the localized constraint system 102 determines the localization loss 810 by utilizing a loss function that determines differences between the cross-attention maps 806*a*-806*n* and the object masks 808*a*-808*n*. Additionally, in some embodiments, the localized constraint system 102 determines a diffusion loss 812 (e.g., mean-squared error) according to the diffusion decoders of the generative neural network 804. The localized constraint system 102 accordingly utilizes a loss function that combines the localization loss 810 and the diffusion loss 812 into a total loss 814.

In additional embodiments, the localized constraint system 102 utilizes the total loss 814 to train the generative neural network 804. In particular, the localized constraint system 102 updates parameters of the generative neural network 804 to reduce an output of the loss function (e.g., to reduce the localization loss 810, the diffusion loss 812, and/or the total loss 814). Thus, the localized constraint system 102 adjusts the parameters of the generative neural network 804 to enforce alignment of the cross-attention maps 806*a*-806*n* of the visual embeddings 802 with the object masks 808*a*-808*n* according to the localization loss 810.

According to one or more embodiments, the localized constraint system 102 determines a total loss $\mathcal{L}$ as a combination of a localization loss $\mathcal{L}_{loc}$ and a diffusion/noise loss $\mathcal{L}_{noise}$. Specifically, the localized constraint system 012 determines the total loss based on a loss function as $\mathcal{L}=\mathcal{L}_{noise}+\lambda\mathcal{L}_{loc}$. Furthermore, in one or more embodiments, the localized constraint system 102 determines the localization loss as $$\mathcal{L}_{loc}=\frac{1}{N}\sum_{i\in\{all\ visual\ tokens\}}(M_i-M_i^{gt}),$$

in which $M_i$ represents a cross-attention map and $$M_i^{gt}$$

represents a corresponding ground-truth object mask. Thus, the localized constraint system 102 determines the localization loss based on the sum of differences between the cross-attention maps and their corresponding ground-truth object masks. Additionally, as indicated, the localized constraint system 102 determines the total loss by summing the localization loss with the diffusion loss.

Figure 9:
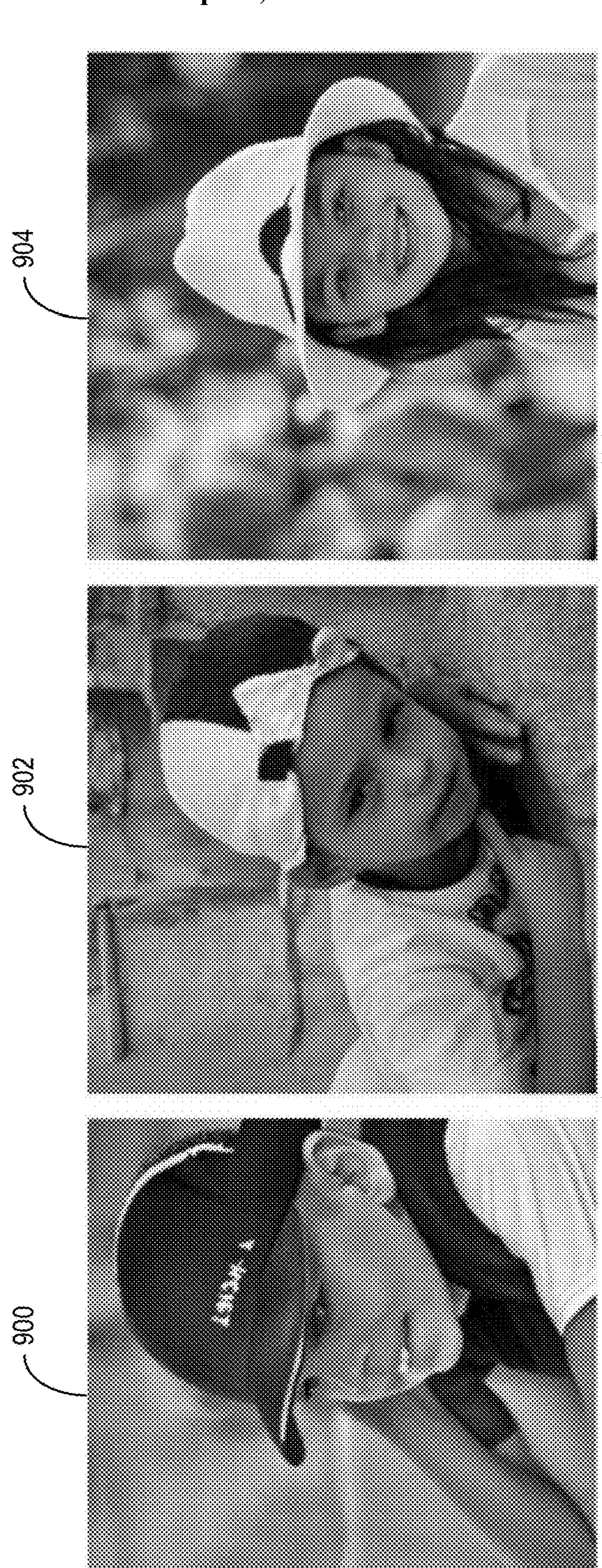
FIG. 9 illustrates a comparison of a plurality of synthetic digital images generated by the localized constraint system, the localized constraint system without visual embeddings, and a conventional image generation system in accordance with one or more implementations.

FIG. 9 illustrates a comparison of digital images generated utilizing the localized constraint system 102 and a conventional image generation system based on a text prompt. Specifically, the text prompt includes text to generate a digital image including "Kid wearing a white shirt and a black hat posing for the camera." FIG. 9 illustrates that the localized constraint system 102 generates a first digital image 900 by generating a sequence of embeddings with visual tokens representing example objects based on the text prompt. Additionally, FIG. 9 illustrates a second digital image 902 generated by the localized constraint system 102 including a generative neural network trained on visual embeddings but without replacing object text embeddings with the visual embeddings based on the text prompt (i.e., in an ablation study). FIG. 9 further illustrates a third digital image 904 generated by the conventional image generation system including a diffusion-based model without the use of visual embeddings in inference or training.

As shown, the localized constraint system 102 generates the first digital image 900 with object composition that is accurate relative to the text prompt, such that the generated objects have the correct visual attributes. FIG. 9 also illustrates that training a generative neural network without using visual embeddings can produces the second digital image 902 that does not accurately compose the objects with correct visual attributes. Furthermore, the third digital image 904 does not include the correct object composition as generated by the conventional image generation system. Accordingly, as illustrated in FIG. 9, the localized constraint system 102 generates synthetic image content with improved accuracy by utilizing modified sequences of embeddings including visual embeddings.

Figure 10A:
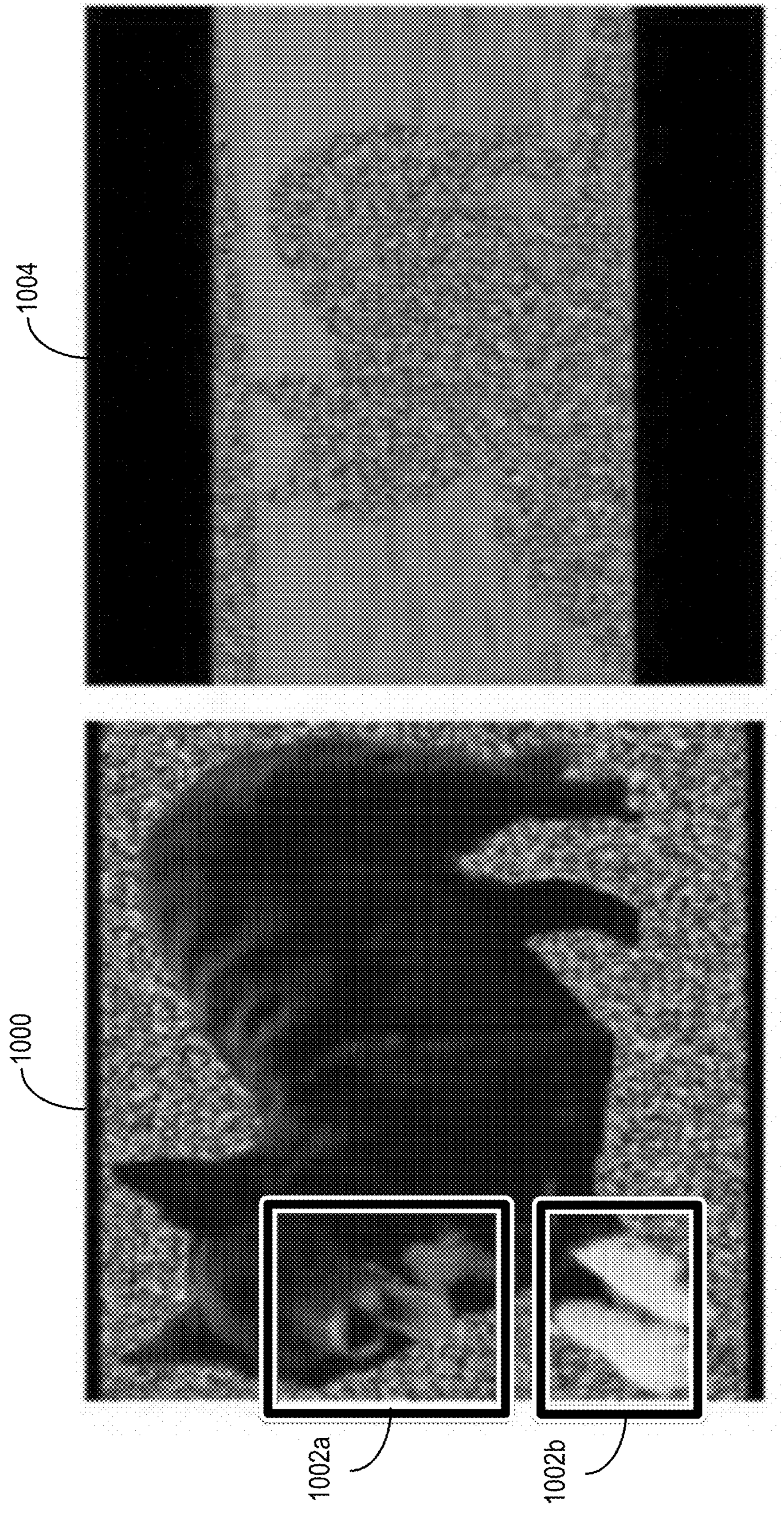
FIG. 10A illustrates example object images provided to the localized constraint system for generating visual embeddings in accordance with one or more implementations.
Figure 10B:
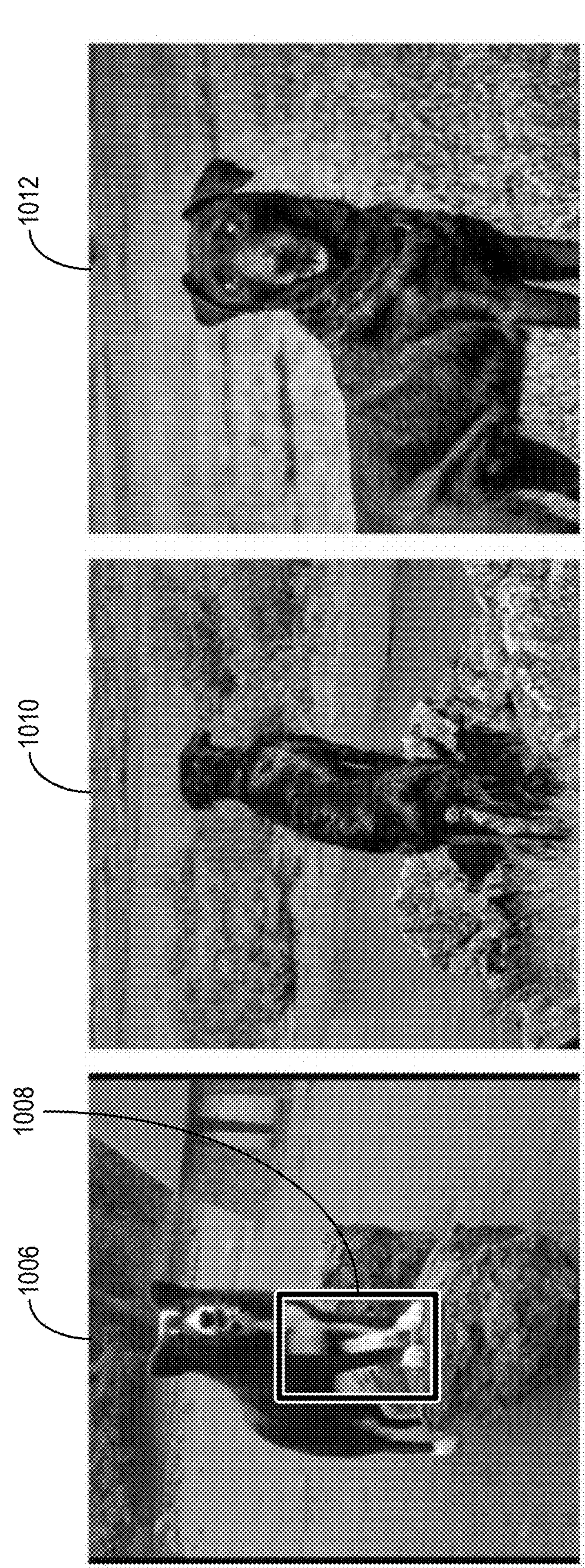
FIG. 10B illustrates example digital images generated utilizing visual embeddings corresponding to the object images of FIG. 10A in accordance with one or more implementations.

In one or more embodiments, the localized constraint system 102 also provides improved flexibility in generating synthetic image content by providing options to customize features of objects. Specifically, FIGS. 10A-10B illustrate an example of the localized constraint system 102 maintaining visual features from example objects in object images in the generated synthetic image content. For example, the localized constraint system 102 utilizes the features of the example objects to condition the generated objects in the synthetic image content.

In particular, as illustrated in FIG. 10A, a first object image 1000 includes an example masked object with a noised background for generating a dog in synthetic image content. Additionally, as shown, FIG. 10A illustrates a first set of visual features 1002*a* and a second set of visual features 1002*b* of the first object. For example, the first set of visual features 1002*a* and the second set of visual features 1002*b* indicate white fur or other distinct features of a black dog. Additionally, FIG. 10A illustrates a second object image 1004 indicating an example masked object for generating a green field in synthetic image content.

In one or more embodiments, the localized constraint system 102 determines the object masks from a digital image provided by, or otherwise selected by, a client device of a user in connection with a text prompt. For example, the user interacts with the client device to generate, upload, or select (e.g., from a database of images) one or more digital images including example objects. To illustrate, the localized constraint system 102 determines objects mentioned in a text prompt and provides a plurality of different versions of example objects in a plurality of different object images. For instance, in response to a prompt of "A black dog stands on a rock, green fields behind it," the localized constraint system 102 generates (or otherwise obtains) images of various types of black dogs from which a user selects. The localized constraint system 102 generates the object masks for each of the objects based on the digital image(s) indicated in connection with the text prompt.

Additionally, the localized constraint system 102 generates visual embeddings representing each of the masked objects for use in generating a sequence of embeddings to provide to a generative neural network. FIG. 10B illustrates a comparison of digital images generated by the localized constraint system 102 and a conventional image generation system. In particular, as shown, the localized constraint system 102 generates a first digital image 1006 based on the text prompt and using visual embeddings representing the object images of FIG. 10A. As shown, the first digital image 1006 includes visual features 1008 of the dog included in the object images.

FIG. 10B also illustrates that the localized constraint system 102 generates a second digital image 1010 based on the text prompt without the user of the visual embeddings corresponding to the object images. FIG. 10B further illustrates that the conventional image generation system (including a diffusion-based model) generates a third digital image 1012 based on the text prompt in an ablation study. Because the second digital image 1010 and the third digital image 1012 are generated without the use of visual embeddings, the resulting objects do not preserve the visual features included in the object images of FIG. 10A. Accordingly, as shown, the localized constraint system 102 improves the flexibility of synthetic image content by providing options to preserve visual features of example objects in a digital image generation process.

Figure 11:
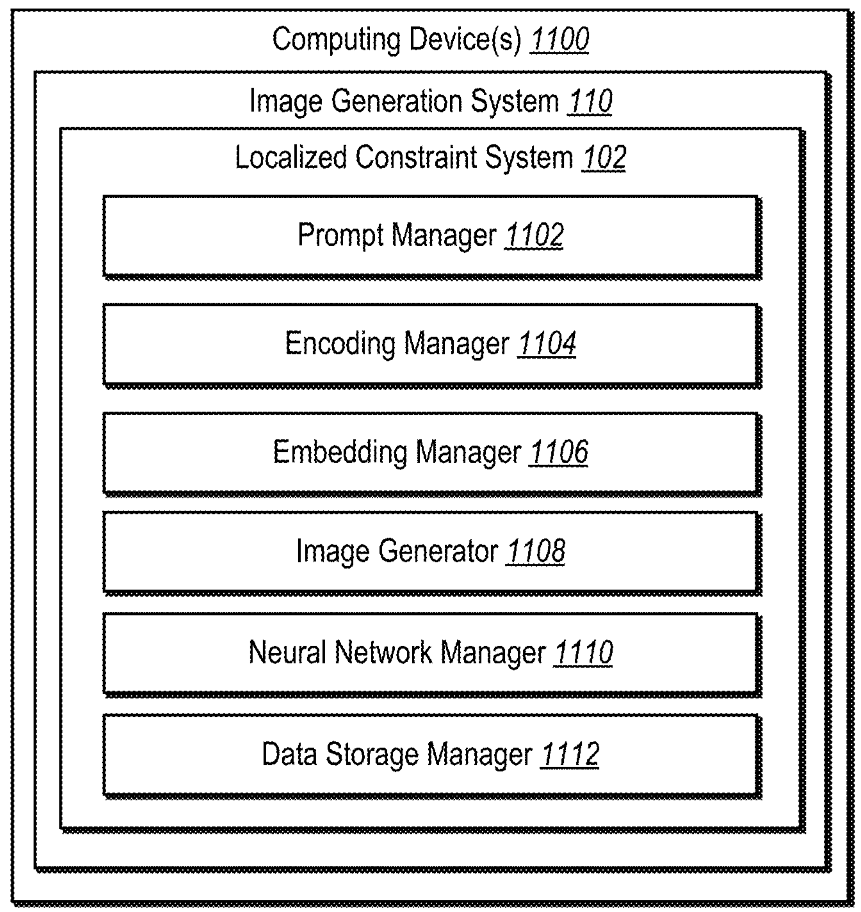
FIG. 11 illustrates a diagram of an example of the localized constraint system in accordance with one or more implementations.

FIG. 11 illustrates a detailed schematic diagram of an embodiment of the localized constraint system 102 described above. As shown, the localized constraint system 102 is implemented in a digital image system 110 on computing device(s) 1100 (e.g., a client device and/or server device as described in FIG. 1, and as further described below in relation to FIG. 13). Additionally, the localized constraint system 102 includes, but is not limited to, a prompt manager 1102, an encoding manager 1104, an embedding manager 1106, an image generator 1108, a neural network manager 1110, and a data storage manager 1112. In one or more embodiments, the localized constraint system 102 is implemented on any number of computing devices. For example, the localized constraint system 102, in one or more embodiments, is implemented in a distributed system of server devices for digital image generation. Alternatively, the localized constraint system 102 is also implemented within one or more additional systems. For example, the localized constraint system 102, in one or more embodiments, is implemented on a single computing device such as a single client device.

In one or more embodiments, each of the components of the localized constraint system 102 is in communication with other components using any suitable communication technologies. Additionally, the components of the localized constraint system 102 are capable of being in communication with one or more other devices including other computing devices of a user, server devices (e.g., cloud storage devices), licensing servers, or other devices/systems. It will be recognized that although the components of the localized constraint system 102 are shown to be separate in FIG. 13, any of the subcomponents may be combined into fewer components, such as into a single component, or divided into more components as may serve a particular implementation. Furthermore, although the components of FIG. 13 are described in connection with the localized constraint system 102, at least some of the components for performing operations in conjunction with the localized constraint system 102 described herein may be implemented on other devices within the environment.

In some embodiments, the components of the localized constraint system 102 include software, hardware, or both. For example, the components of the localized constraint system 102 include one or more instructions stored on a computer-readable storage medium and executable by processors of one or more computing devices (e.g., the computing device(s) 1100). When executed by the one or more processors, the computer-executable instructions of the localized constraint system 102 cause the computing device (s) 1100 to perform the operations described herein. Alternatively, the components of the localized constraint system 102 include hardware, such as a special purpose processing device to perform a certain function or group of functions. Additionally, or alternatively, the components of the localized constraint system 102 include a combination of computer-executable instructions and hardware.

Furthermore, the components of the localized constraint system 102 performing the functions described herein with respect to the localized constraint system 102 may, for example, be implemented as part of a stand-alone application, as a module of an application, as a plug-in for applications, as a library function or functions that may be called by other applications, and/or as a cloud-computing model. Thus, the components of the localized constraint system 102 may be implemented as part of a stand-alone application on a personal computing device or a mobile device. Alternatively, or additionally, the components of the localized constraint system 102 may be implemented in any application that provides digital image difference captioning, including, but not limited to ADOBE® PHOTOSHOP® and ADOBE® CREATIVE CLOUD® software.

As illustrated, the localized constraint system 102 includes a prompt manager 1102 to manage text prompts for generating a digital image. In particular, the prompt manager 1102 determines text prompts based on user inputs to a user interface to generate synthetic image content. Additionally, the prompt manager 1102 parses text prompts to determine phrases indicating objects for including in a digital image.

In one or more embodiments, the localized constraint system 102 includes an encoding manager 1104 to encode information from a text prompt and/or images into a feature space. For example, the encoding manager 1104 utilizes an encoder neural network to generate text embeddings (e.g., object text embeddings) from phrases in a text prompt. Additionally, the encoding manager 1104 utilizes an encoder neural network to generate visual embeddings from object images.

The localized constraint system 102 also utilizes an embedding manager 1106 to generate and modify sequences of embeddings. In particular, the embedding manager 1106 determines initial sequences of embeddings including object text embeddings from text prompts. Additionally, the embedding manager 1106 determines modified sequences of embeddings by replacing object text embeddings with corresponding visual embeddings.

The localized constraint system 102 includes an image generator 1108 to generate synthetic image content. In particular, the image generator 1108 utilizes a generative neural network (e.g., a diffusion-based model) to generate a digital image from a sequence of embeddings. More specifically, the image generator 1108 utilizes the generative neural network to generate synthetic image content based on a modified sequence of embeddings including visual embeddings.

In one or more embodiments, the localized constraint system 102 utilizes a neural network manager 1110 to train one or more neural networks. For example, the neural network manager 1110 determines localized losses based on cross-attention maps generated by a generative neural network and ground-truth object masks from training images. In addition, the neural network manager 1110 utilizes localization losses to adjust parameters of a generative neural network.

The localized constraint system 102 also includes a data storage manager 1112 (that comprises a non-transitory computer memory) that stores and maintains data associated with generating synthetic digital images. For example, the data storage manager 1112 stores data associated with synthesizing digital image content with localized constraints utilizing visual embeddings in a sequence of embeddings. In some embodiments, the data storage manager 1112 stores text embeddings, visual embeddings, and synthesized digital image data. The data storage manager 1112 further stores data associated with training and utilizing various neural networks, including an encoder neural network and various decoder neural networks in a generative neural network.

Figure 12:
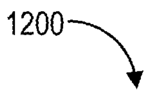
FIG. 12 illustrates a flowchart of a series of acts for generating a synthetic digital image by enforcing localized constraints via a sequence of embeddings including visual embeddings in accordance with one or more implementations.
Figure 12:
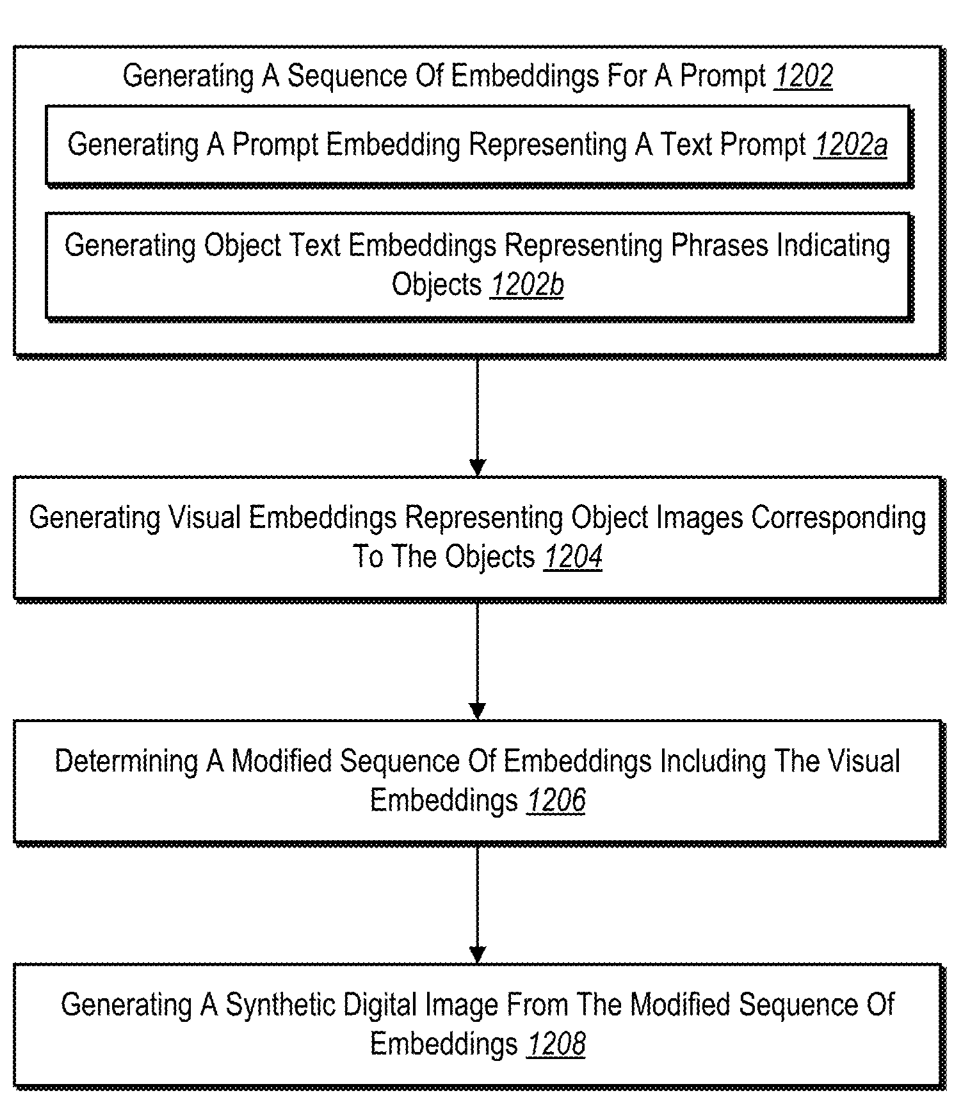

Turning now to FIG. 12, this figure shows a flowchart of a series of acts 1200 of generating a synthetic digital image by enforcing localized constraints via a sequence of embeddings including visual embeddings. While FIG. 12 illustrates acts according to one embodiment, alternative embodiments may omit, add to, reorder, and/or modify any of the acts shown in FIG. 12. The acts of FIG. 12 are part of a method. Alternatively, a non-transitory computer readable medium comprises instructions, that when executed by one or more processors, cause the one or more processors to perform the acts of FIG. 12. In still further embodiments, a system includes a processor or server configured to perform the acts of FIG. 12.

As shown, the series of acts 1200 includes an act 1202 of generating a sequence of embeddings for a prompt. Act 1200 includes a sub-act **1202*a* of generating a prompt embedding representing a text prompt and a sub-act 1202*b* of generating object text embeddings representing phrases indicating objects. The series of acts 1200 includes an act 1204 of generating visual embeddings representing object images corresponding to the object. The series of acts 1200 also includes an act 1206 of determining a modified sequence of embeddings including the visual embeddings. Additionally, the series of acts 1200 includes an act 1208** of generating a synthetic digital image from the modified sequence of embeddings.

In one or more embodiments, act 1202 involves generating, utilizing one or more encoder neural networks, a sequence of embeddings comprising a prompt embedding representing a text prompt and an object text embedding representing a phrase indicating an object in the text prompt.

Additionally, act 1204 involves generating, utilizing the one or more encoder neural networks, a visual embedding representing an object image corresponding to the object. Act 1206 involves determining a modified sequence of embeddings by replacing the object text embedding with the visual embedding in the sequence of embeddings. Act 1208 further involves generating, utilizing a generative neural network, a synthetic digital image from the modified sequence of embeddings comprising the visual embedding.

In at least some embodiments, the series of acts 1200 includes generating the sequence of embeddings by determining, from the text prompt, a plurality of phrases indicating a plurality of objects in the text prompt. For example, the series of acts 1200 includes generating, based on the plurality of phrases, the object text embedding representing the phrase indicating the object. The series of acts 1200 further includes generating, based on the plurality of phrases, an additional object text embedding representing an additional phrase indicating an additional object.

Furthermore, the series of acts 1200 includes generating the object image by an example object based on the phrase indicating the object. For example, the series of acts 1200 includes generating an additional object image comprising an additional example object based on an additional phrase indicating an additional object in the text prompt. Additionally, the series of acts 1200 includes generating an additional visual embedding representing the additional object image corresponding to the additional object.

The series of acts 1200 also includes determining the modified sequence of embeddings by determining a position of the object text embedding in the sequence of embeddings. The series of acts 1200 also includes removing the object text embedding from the sequence of embeddings. The series of acts 1200 further includes inserting the visual embedding into the sequence of embeddings at the position.

Additionally, the series of acts 1200 includes generating the sequence of embeddings comprises generating the object text embedding in a feature space. The series of acts 1200 also includes generating the visual embedding comprises generating the visual embedding in the feature space of the object text embedding.

The series of acts 1200 also includes generating, for a caption corresponding to an additional digital image, an additional sequence of embeddings comprising a plurality of object text embeddings representing a plurality of phrases in the caption, the plurality of phrases indicating a plurality of objects in the additional digital image. The series of acts 1200 further includes generating a plurality of visual embeddings representing the plurality of objects in the additional digital image. Additionally, the series of acts 1200 includes determining an additional modified sequence of embeddings by replacing the plurality of object text embeddings with the plurality of visual embeddings. The series of acts 1200 further includes adjusting parameters of the generative neural network by reducing an output of a loss function based on the additional modified sequence of embeddings.

In one or more embodiments, the series of acts 1200 includes adjusting the generative neural network by determining a plurality of ground-truth masks corresponding to the plurality of objects of the additional digital image. The series of acts 1200 also includes determining, utilizing the loss function, a localization loss based on comparisons between the plurality of ground-truth masks and a plurality of cross-attention maps corresponding to the plurality of visual embeddings. The series of acts 1200 also includes adjusting the parameters of the generative neural network according to the localization loss.

In one or more embodiments, the series of acts 1200 includes generating, utilizing one or more encoder neural networks, a sequence of embeddings comprising a first object text embedding representing a first phrase indicating a first object in a text prompt and a second object text embedding representing a second phrase indicating a second object in the text prompt. The series of acts 1200 also includes generating, utilizing the one or more encoder neural networks, a first visual embedding representing a first object image corresponding to the first object and a second visual embedding representing a second object image corresponding to the second object. The series of acts 1200 further includes determining a modified sequence of embeddings by replacing, in the sequence of embeddings, the first object text embedding with the first visual embedding and the second object text embedding with the second visual embedding. Additionally, the series of acts 1200 also includes generating, utilizing a generative neural network, a synthetic digital image from the modified sequence of embeddings comprising the first visual embedding and the second visual embedding.

In one or more embodiments, the series of acts 1200 also includes generating the sequence of embeddings by generating, utilizing the one or more encoder neural networks, a prompt embedding representing the text prompt in a feature space corresponding to the first object text embedding and the second object text embedding.

In some embodiments, the series of acts 1200 includes generating the sequence of embeddings by parsing the text prompt to: determine the first object and one or more visual attributes of the first object; and determine the second object and one or more visual attributes of the second object. For example, the series of acts 1200 includes determining, based on the first phrase, the first object image comprising a first example object including the one or more visual attributes of the first object. The series of acts 1200 also includes determining, based on the second phrase, the second object image comprising a second example object including the one or more visual attributes of the second object.

The series of acts 1200 also includes determining the modified sequence of embeddings by determining a first location in the sequence of embeddings corresponding to the first object text embedding and a second location in the sequence of embeddings corresponding to the second object text embedding. The series of acts 1200 further includes removing the first object text embedding and the second object text embedding from the sequence of embeddings. Additionally, the series of acts 1200 includes inserting the first visual embedding at the first location and the second visual embedding at the second location.

The series of acts 1200 further includes generating the synthetic digital image by providing the modified sequence of embeddings with a noised image embedding to the generative neural network.

Additionally, in some embodiments, the series of acts 1200 includes generating a plurality of visual embeddings from a plurality of object text embeddings representing phrases in captions of objects in a training digital image. The series of acts 1200 includes determining an additional modified sequence of embeddings by replacing the plurality of object text embeddings with the plurality of visual embeddings in a corresponding sequence of embeddings. The series of acts 1200 includes adjusting parameters of the generative neural network by reducing an output of a loss function based on the additional modified sequence of embeddings.

Additionally, the series of acts 1200 includes determining a plurality of ground-truth masks corresponding to the objects of the training digital image. The series of acts 1200 further includes determining cross-attention maps generated by the generative neural network for the plurality of visual embeddings of the additional modified sequence of embeddings. The series of acts 1200 also includes adjusting the parameters of the generative neural network to reduce the output of the loss function based on comparisons between the plurality of ground-truth masks and the cross-attention maps.

In some embodiments, the series of acts 1200 includes determining, by parsing a text prompt for generating or modifying a digital image, a plurality of phrases corresponding to a plurality of objects. The series of acts 1200 also includes generating, utilizing one or more encoder neural networks, a sequence of embeddings comprising a plurality of object text embeddings representing the plurality of phrases corresponding to the plurality of objects. Additionally, the series of acts 1200 includes generating, utilizing the one or more encoder neural networks, a plurality of visual embeddings representing a plurality of object images corresponding to the plurality of objects. The series of acts 1200 further includes determining a modified sequence of embeddings by replacing the plurality of object text embeddings with the plurality of visual embeddings in the sequence of embeddings. The series of acts 1200 also includes generating, utilizing a generative neural network, a synthetic digital image from the modified sequence of embeddings comprising the plurality of visual embeddings.

In one or more embodiments, the series of acts 1200 includes parsing the text prompt by: determining a first phrase corresponding to a first object of the digital image and one or more visual attributes of the first object; and determining a second phrase corresponding to a second object of the digital image and one or more visual attributes of the second object. The series of acts 1200 also includes generating the sequence of embeddings comprises generating a first object text embedding representing the first phrase and a second object text embedding representing the second phrase.

In some embodiments, the series of acts 1200 includes generating the plurality of visual embeddings by determining a first object image comprising a first example object including the one or more visual attributes of the first object. Additionally, the series of acts 1200 includes determining a second object image comprising a second example object including the one or more visual attributes of the second object. The series of acts 1200 also includes generating, utilizing the one or more encoder neural networks, a first visual embedding representing the first object image and a second visual embedding representing the second object image.

In one or more embodiments, the series of acts 1200 includes determining the modified sequence of embeddings by determining locations corresponding to the plurality of object text embeddings in the sequence of embeddings. The series of acts 1200 includes replacing the plurality of object text embeddings with the plurality of visual embeddings at the locations in the sequence of embeddings.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
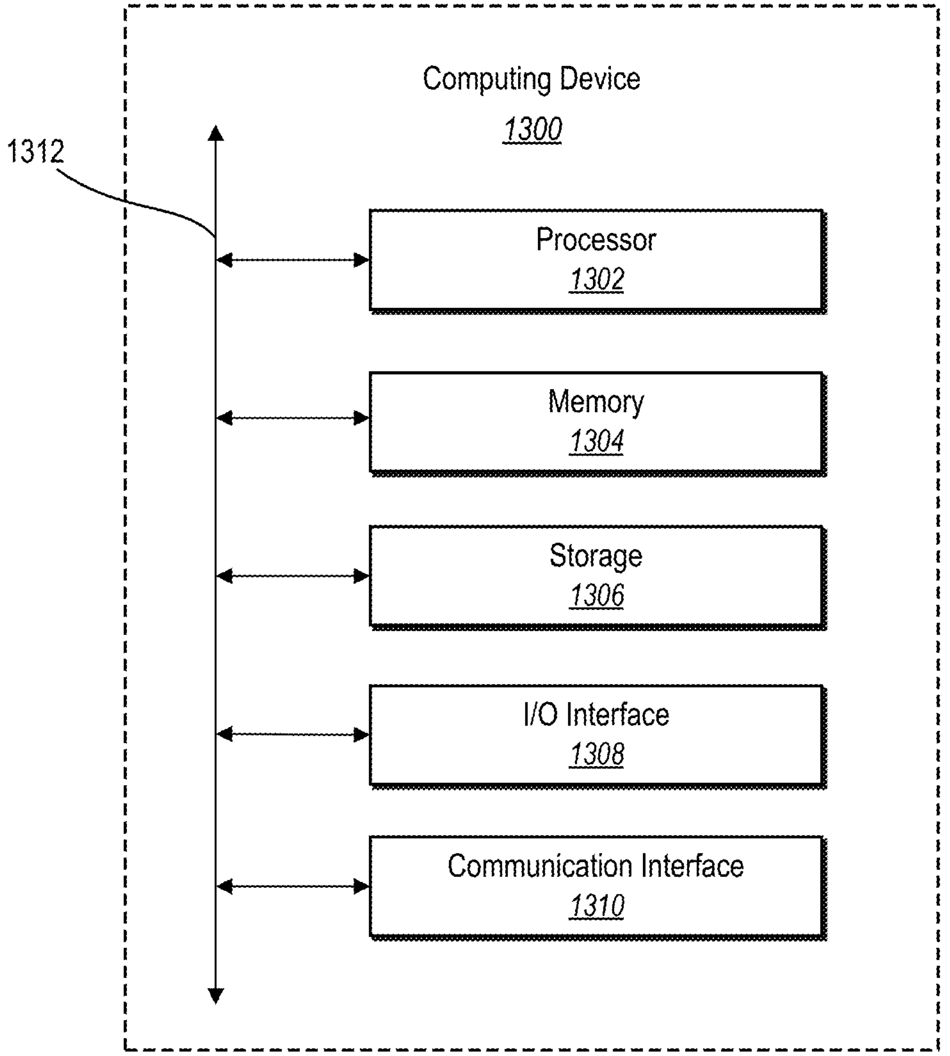
FIG. 13 illustrates a block diagram of an exemplary computing device in accordance with one or more implementations.

FIG. 13 illustrates a block diagram of exemplary computing device 1300 that may be configured to perform one or more of the processes described above. One will appreciate that one or more computing devices such as the computing device 1300 may implement the system(s) of FIG. 1. As shown by FIG. 13, the computing device 1300 can comprise a processor 1302, a memory 1304, a storage device 1306, an I/O interface 1308, and a communication interface 1310, which may be communicatively coupled by way of a communication infrastructure 1312. In certain embodiments, the computing device 1300 can include fewer or more components than those shown in FIG. 13. Components of the computing device 1300 shown in FIG. 13 will now be described in additional detail.

In one or more embodiments, the processor 1302 includes hardware for executing instructions, such as those making up a computer program. As an example, and not by way of limitation, to execute instructions for dynamically modifying workflows, the processor 1302 may retrieve (or fetch) the instructions from an internal register, an internal cache, the memory 1304, or the storage device 1306 and decode and execute them. The memory 1304 may be a volatile or non-volatile memory used for storing data, metadata, and programs for execution by the processor(s). The storage device 1306 includes storage, such as a hard disk, flash disk drive, or other digital storage device, for storing data or instructions for performing the methods described herein.

The I/O interface 1308 allows a user to provide input to, receive output from, and otherwise transfer data to and receive data from computing device 1300. The I/O interface 1308 may include a mouse, a keypad or a keyboard, a touch screen, a camera, an optical scanner, network interface, modem, other known I/O devices or a combination of such I/O interfaces. The I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1308 is configured to provide graphical data to a display for presentation to a user. The graphical data may be representative of one or more graphical user interfaces and/or any other graphical content as may serve a particular implementation.

The communication interface 1310 can include hardware, software, or both. In any event, the communication interface 1310 can provide one or more interfaces for communication (such as, for example, packet-based communication) between the computing device 1300 and one or more other computing devices or networks. As an example, and not by way of limitation, the communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1310 may facilitate communications with various types of wired or wireless networks. The communication interface 1310 may also facilitate communications using various communication protocols. The communication infrastructure 1312 may also include hardware, software, or both that couples components of the computing device 1300 to each other. For example, the communication interface 1310 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:

generating, utilizing one or more encoder neural networks, a sequence of embeddings comprising a prompt embedding representing a text prompt and an object text embedding representing a phrase in the text prompt, wherein the phrase indicates an object;

generating, utilizing the one or more encoder neural networks, a visual embedding representing an object image corresponding to the object;

determining a modified sequence of embeddings by replacing the object text embedding with the visual embedding in the sequence of embeddings; and generating, utilizing a generative neural network, a synthetic digital image from the modified sequence of embeddings comprising the visual embedding.

2. The computer-implemented method of claim 1, wherein generating the sequence of embeddings comprises:

determining, from the text prompt, a plurality of phrases indicating a plurality of objects in the text prompt;

generating, based on the plurality of phrases, the object text embedding representing the phrase indicating the object; and generating, based on the plurality of phrases, an additional object text embedding representing an additional phrase indicating an additional object.

3. The computer-implemented method of claim 1, wherein generating the visual embedding comprises generating the object image comprising an example object based on the phrase indicating the object.

4. The computer-implemented method of claim 3, further comprising:

generating an additional object image comprising an additional example object based on an additional phrase indicating an additional object in the text prompt; and generating an additional visual embedding representing the additional object image corresponding to the additional object.

5. The computer-implemented method of claim 1, wherein determining the modified sequence of embeddings comprises:

determining a position of the object text embedding in the sequence of embeddings;

removing the object text embedding from the sequence of embeddings; and inserting the visual embedding into the sequence of embeddings at the position.

6. The computer-implemented method of claim 1, wherein:

generating the sequence of embeddings comprises generating the object text embedding in a feature space; and generating the visual embedding comprises generating the visual embedding in the feature space of the object text embedding.

7. The computer-implemented method of claim 1, further comprising:

generating, for a caption corresponding to an additional digital image, an additional sequence of embeddings comprising a plurality of object text embeddings representing a plurality of phrases in the caption, the plurality of phrases indicating a plurality of objects in the additional digital image;

generating a plurality of visual embeddings representing the plurality of objects in the additional digital image;

determining an additional modified sequence of embeddings by replacing the plurality of object text embeddings with the plurality of visual embeddings; and adjusting parameters of the generative neural network by reducing an output of a loss function based on the additional modified sequence of embeddings.

8. The computer-implemented method of claim 7, wherein adjusting the parameters of the generative neural network comprises:

determining a plurality of ground-truth masks corresponding to the plurality of objects of the additional digital image;

determining, utilizing the loss function, a localization loss based on comparisons between the plurality of ground-truth masks and a plurality of cross-attention maps corresponding to the plurality of visual embeddings; and adjusting the parameters of the generative neural network according to the localization loss.

9. A system comprising:

one or more memory devices; and one or more processors configured to cause the system to:

generate, utilizing one or more encoder neural networks, a sequence of embeddings comprising a first object text embedding representing a first phrase in a text prompt, wherein the first phrase indicates a first object, and a second object text embedding representing a second phrase in the text prompt, wherein the second phrase indicates a second object;

generate, utilizing the one or more encoder neural networks, a first visual embedding representing a first object image corresponding to the first object and a second visual embedding representing a second object image corresponding to the second object;

determine a modified sequence of embeddings by replacing, in the sequence of embeddings, the first object text embedding with the first visual embedding and the second object text embedding with the second visual embedding; and generate, utilizing a generative neural network, a synthetic digital image from the modified sequence of embeddings comprising the first visual embedding and the second visual embedding.

10. The system of claim 9, wherein the one or more processors are further configured to generate the sequence of embeddings by generating, utilizing the one or more encoder neural networks, a prompt embedding representing the text prompt in a feature space corresponding to the first object text embedding and the second object text embedding.

11. The system of claim 9, wherein the one or more processors are further configured to generate the sequence of embeddings by parsing the text prompt to:

determine the first object and one or more visual attributes of the first object; and determine the second object and one or more visual attributes of the second object.

12. The system of claim 11, wherein the one or more processors are further configured to:

determine, based on the first phrase, the first object image comprising a first example object including the one or more visual attributes of the first object; and determine, based on the second phrase, the second object image comprising a second example object including the one or more visual attributes of the second object.

13. The system of claim 9, wherein the one or more processors are further configured to determine the modified sequence of embeddings by:

determining a first location in the sequence of embeddings corresponding to the first object text embedding and a second location in the sequence of embeddings corresponding to the second object text embedding;

removing the first object text embedding and the second object text embedding from the sequence of embeddings; and inserting the first visual embedding at the first location and the second visual embedding at the second location.

14. The system of claim 9, wherein the one or more processors are further configured to generate the synthetic digital image by providing the modified sequence of embeddings with a noised image embedding to the generative neural network.

15. The system of claim 9, wherein the one or more processors are further configured to:

generate a plurality of visual embeddings from a plurality of object text embeddings representing phrases in captions of objects in a training digital image;

determine an additional modified sequence of embeddings by replacing the plurality of object text embeddings with the plurality of visual embeddings in a corresponding sequence of embeddings; and adjust parameters of the generative neural network by reducing an output of a loss function based on the additional modified sequence of embeddings.

16. The system of claim 15, wherein the one or more processors are further configured to adjust the parameters of the generative neural network:

determine a plurality of ground-truth masks corresponding to the objects of the training digital image;

determine cross-attention maps generated by the generative neural network for the plurality of visual embeddings of the additional modified sequence of embeddings; and adjust the parameters of the generative neural network to reduce the output of the loss function based on comparisons between the plurality of ground-truth masks and the cross-attention maps.

17. A non-transitory computer readable medium storing executable instructions which, when executed by at least one processing device, cause the at least one processing device to perform operations comprising:

determining, by parsing a text prompt for generating or modifying a digital image, a plurality of phrases corresponding to a plurality of objects;

generating, utilizing one or more encoder neural networks, a sequence of embeddings comprising a plurality of object text embeddings representing the plurality of phrases in the text prompt, wherein the plurality of phrases corresponds to the plurality of objects;

generating, utilizing the one or more encoder neural networks, a plurality of visual embeddings representing a plurality of object images corresponding to the plurality of objects;

determining a modified sequence of embeddings by replacing the plurality of object text embeddings with the plurality of visual embeddings in the sequence of embeddings; and generating, utilizing a generative neural network, a synthetic digital image from the modified sequence of embeddings comprising the plurality of visual embeddings.

18. The non-transitory computer readable medium of claim 17, wherein:

parsing the text prompt comprises:

determining a first phrase corresponding to a first object of the digital image and one or more visual attributes of the first object; and determining a second phrase corresponding to a second object of the digital image and one or more visual attributes of the second object; and generating the sequence of embeddings comprises generating a first object text embedding representing the first phrase and a second object text embedding representing the second phrase.

19. The non-transitory computer readable medium of claim 18, wherein generating the plurality of visual embeddings comprises:

determining a first object image comprising a first example object including the one or more visual attributes of the first object;

determining a second object image comprising a second example object including the one or more visual attributes of the second object; and generating, utilizing the one or more encoder neural networks, a first visual embedding representing the first object image and a second visual embedding representing the second object image.

20. The non-transitory computer readable medium of claim 18, wherein determining the modified sequence of embeddings comprises:

determining locations corresponding to the plurality of object text embeddings in the sequence of embeddings; and replacing the plurality of object text embeddings with the plurality of visual embeddings at the locations in the sequence of embeddings.

* * * * *